United States Patent
Kim et al.

(10) Patent No.: US 9,071,085 B2
(45) Date of Patent: Jun. 30, 2015

(54) SYSTEM FOR WIRELESS POWER TRANSMISSION AND RECEPTION USING IN-BAND COMMUNICATION

(75) Inventors: Nam Yun Kim, Seoul (KR); Sang Wook Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 818 days.

(21) Appl. No.: 13/330,204

(22) Filed: Dec. 19, 2011

(65) Prior Publication Data
US 2012/0161539 A1    Jun. 28, 2012

(30) Foreign Application Priority Data
Dec. 23, 2010   (KR) .................. 10-2010-0133244

(51) Int. Cl.
*H01F 27/42* (2006.01)
*H02J 17/00* (2006.01)

(52) U.S. Cl.
CPC . *H02J 17/00* (2013.01); *Y02B 60/50* (2013.01)

(58) Field of Classification Search
USPC ....................................... 307/104
See application file for complete search history.

(56) References Cited

U.S. PATENT DOCUMENTS

| | | | |
|---|---|---|---|
| 8,493,192 B2 * | 7/2013 | Kofler ................ | 340/426.16 |
| 2005/0168195 A1 | 8/2005 | MacDougall | |
| 2010/0259217 A1 * | 10/2010 | Baarman et al. ........... | 320/108 |
| 2011/0127954 A1 * | 6/2011 | Walley et al. ............ | 320/108 |
| 2011/0235800 A1 * | 9/2011 | Furukawa et al. ........... | 380/33 |
| 2014/0044293 A1 * | 2/2014 | Ganem et al. ............ | 381/323 |
| 2014/0111156 A1 * | 4/2014 | Lee et al. ............... | 320/108 |

FOREIGN PATENT DOCUMENTS

| | | |
|---|---|---|
| JP | 2006-314181 | 11/2006 |
| KR | 1020090096544 | 9/2009 |
| KR | 1020100017073 | 2/2010 |
| KR | 1020100067749 | 6/2010 |
| WO | WO-03/105308 A1 | 12/2003 |
| WO | WO-2008/035248 A2 | 3/2008 |
| WO | WO-2008/137996 A1 | 11/2008 |

OTHER PUBLICATIONS

International Search Report mailed Jul. 31, 2012, issued in counterpart International Patent Application No. PCT/KR2011/009762; 3 pages in English language.

* cited by examiner

*Primary Examiner* — Jared Fureman
*Assistant Examiner* — Duc M Pham
(74) *Attorney, Agent, or Firm* — NSIP Law

(57) ABSTRACT

A wireless power transmitter and receiver using an in-band communication and a method thereof are provided. In one embodiment, a wireless power transmitter using an in-band communication may include: a source resonance unit including a source resonator that is configured to transmit wireless power to one or more in-band resonators; a source controller configured to control a resonance frequency and an impedance of the source resonator, to detect an in-band resonator located in a location corresponding to a wireless power receiver among the in-band resonators, and to generate a control signal of the detected in-band resonator; and an in-band resonance unit configured to receive and demodulate identification information associated with the wireless power receiver via the one or more in-band resonators, and to transmit the wireless power and transmission data via the in-band resonator corresponding to the wireless power receiver.

20 Claims, 18 Drawing Sheets

$$\omega_{MZR} = \frac{1}{\sqrt{L_R C_L}}$$

SYSTEM FOR WIRELESS POWER TRANSMISSION AND RECEPTION USING IN-BAND COMMUNICATION

CROSS-REFERENCE TO RELATED APPLICATION(S)

This application claims the benefit under 35 U.S.C. §119 (a) of Korean Patent Application No. 10-2010-0133244, filed on Dec. 23, 2010, in the Korean Intellectual Property Office, the entire disclosure of which is incorporated herein by reference for all purposes.

BACKGROUND

1. Field

The following description relates to a wireless power transmission and reception using an in-band communication.

2. Description of Related Art

As demand for portable electronic devices has rapidly increased, wired power supplies have become inconvenient. Studies on wireless power transmission have been conducted to overcome the inconveniences of a wired power supplies and the limited capacity of conventional batteries. One conventional wireless power transmission technology uses a resonance characteristic of radio frequency (RF) devices including a source that supplies power and a target that receives power.

SUMMARY

According to one general aspect, a wireless power transmitter using an in-band communication may include: a source resonance unit including a source resonator that is configured to transmit wireless power to one or more in-band resonators; a source controller configured to control a resonance frequency and an impedance of the source resonator, to detect an in-band resonator located in a location corresponding to a wireless power receiver among the in-band resonators, and to generate a control signal of the detected in-band resonator; and an in-band resonance unit configured to receive and demodulate identification information associated with the wireless power receiver via the one or more in-band resonators, and to transmit the wireless power and transmission data via the in-band resonator corresponding to the wireless power receiver.

The wireless power transmitter may further include: a power converting unit configured to convert a DC voltage of a predetermined level into an AC power based on a predetermined switching pulse signal; a power amplifier configured to amplify the AC power to an AC power of at least a predetermined value; and a matching controller configured to set, based on the demodulated identification information, an impedance matching frequency and a resonance bandwidth of the source resonator that is to transmit the amplified AC power.

The in-band resonance unit may include: an array resonator including an array of in-band resonators, one or more of the in-band resonators configured to transmit wireless power and transmission data to a corresponding predetermined area; a modulator configured to modulate the transmission data by controlling the switching of the in-band resonators; a demodulator configured to demodulate reception data received from the wireless power receiver; and an in-band resonator controller configured to control modulation of the transmission data and demodulation of the reception data.

The in-band resonators may be positioned between the source resonator and a target resonator so as to increase a wireless power transmission distance between the source resonator and the target resonator.

The array resonance unit may be configured to receive the reception data from the wireless power receiver via one or more of the in-band resonators.

The array resonance unit may be configured to switch on a switch of an in-band resonator that transmits the wireless power among the in-band resonators, and to switch remaining in-band resonators off.

The modulator may be configured to switch a predetermined number of in-band resonators among the in-band resonators on and off.

The modulator may be configured to perform analog modulation or digital modulation of the transmission data by switching the in-band resonators on and off.

The source controller may be configured to receive the demodulated reception data to determine whether to charge the wireless power receiver, and to generate the control signal of the in-band resonator corresponding to the wireless power receiver to enable the wireless power to be transmitted via the in-band resonator.

The wireless power and the transmission data may be simultaneously transmitted.

According to another general aspect, a wireless power receiver using an in-band communication may include: a target resonance unit configured to receive, from an in-band resonator, a wireless power and reception data including a wake-up signal; a demodulator configured to demodulate the reception data including the wake-up signal; a modulator configured to modulate transmission data including a response signal with respect to the wake-up signal, a charging request signal, and an identification (ID) of a target resonator that is awoken; and a target controller configured to control an impedance to perform impedance matching between a source resonator, the in-band resonator, and the awoken target resonator.

The wireless power receiver may further include: a power determining unit configured to determine, based on the reception data, whether the target resonator is awoken and whether to charge a load.

The target resonance unit may be configured to transmit the modulated transmission data to the in-band resonator.

According to yet another general aspect, a method of transmitting wireless power using an in-band communication may include: receiving identification information associated with a wireless power receiver, via in-band resonators; demodulating the received identification information; controlling, based on the demodulated identification information, an impedance and a resonance frequency of a source resonator; transmitting the wireless power from the source resonator to the in-band resonators via a magnetic coupling; and transmitting the wireless power and transmission data, via an in-band resonator corresponding to the wireless power receiver from among the in-band resonators.

The method may further include: detecting, from among the in-band resonators, the in-band resonator corresponding to the wireless power receiver; and generating a control signal of the detected in-band resonator.

Transmitting the wireless power and the transmission data may include: modulating the transmission data by switching switches of the in-band resonators on and off; demodulating reception data received from the wireless power receiver; and transmitting the wireless power and the transmission data to a predetermined area via an array in-band resonators configured by forming the array of the in-band resonators.

The wireless power and the transmission data may be simultaneously transmitted.

According to a further general aspect, a method of receiving wireless power using an in-band communication may include: receiving wireless power and reception data including a wake-up signal, from an in-band resonator; demodulating the reception data including the wake-up signal; modulating transmission data including a response signal with respect to the wake-up signal, a charging request signal, and an identification (ID) of a target resonator that is awoken; and controlling an impedance used to perform impedance matching between a source resonator, the in-band resonator, and the awoken target resonator.

The method may further include: determining, based on the reception data, whether the target resonator is awoken and whether to charge a load.

The wireless power and the reception data may be received via a magnetic coupling.

Other features and aspects may be apparent from the following detailed description, the drawings, and the claims.

Figure 1:
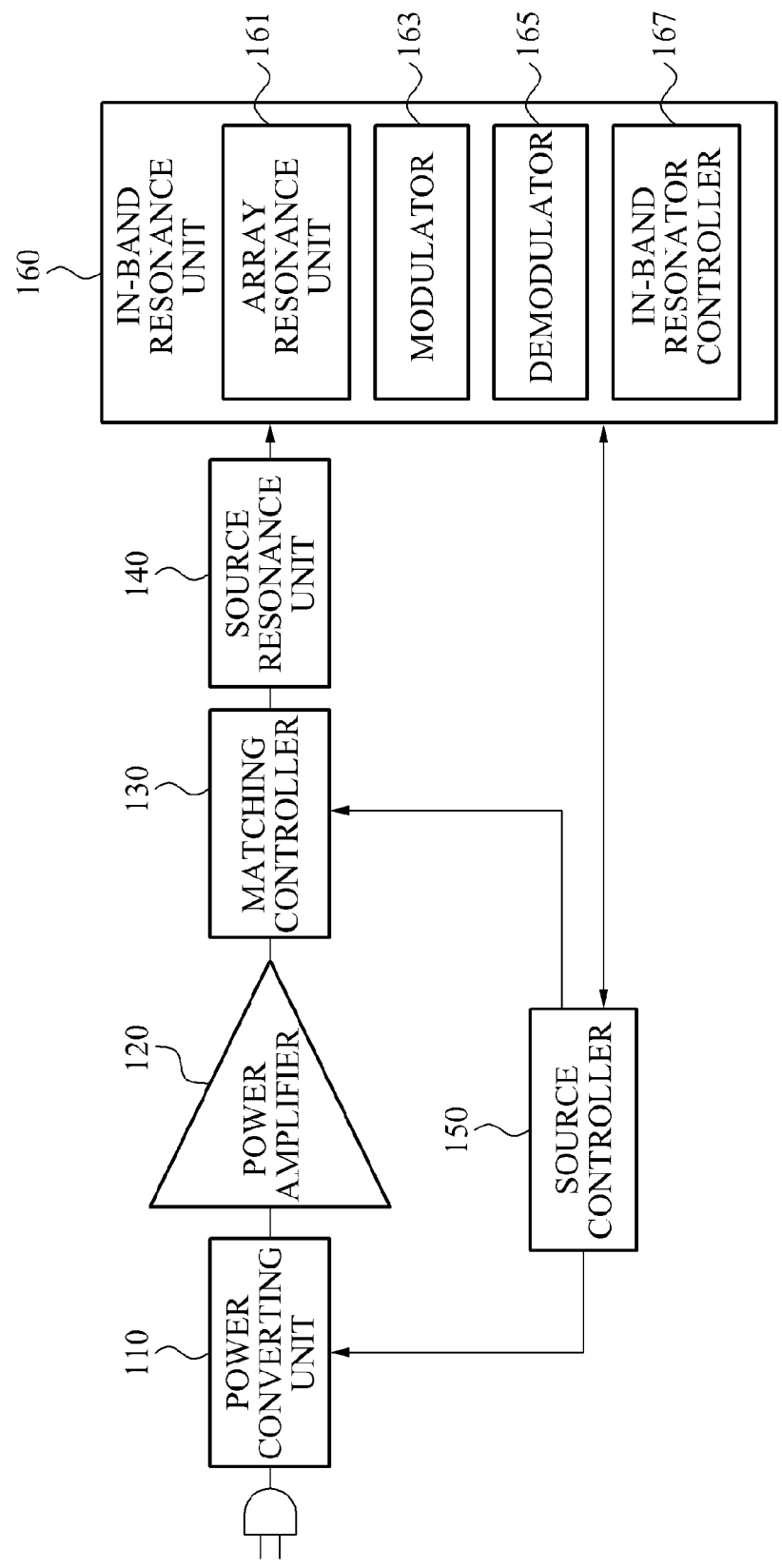
FIG. 1 is a block diagram illustrating a wireless power transmitter using an in-band communication.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

In a wireless power transmission using a resonance characteristic, transmission efficiency may be determined based on a resonance frequency matching and an impedance matching between a wireless power transmitter and a wireless power receiver. The impedance matching and the resonance frequency matching may be performed by using an impedance tracking scheme and/or a resonance frequency tracking scheme. For example, a separate communication device and a monitoring device may be used to perform the tracking scheme. Power loss may occur from an added circuit and a complexity in a producing process may increase and thus, there is a desire for a tracking scheme without an additional circuit.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency.

FIG. 1 illustrates a wireless power transmitter using an in-band communication.

Wireless power transmitted by the wireless power transmitter may include resonance power. For example, the wireless power transmitter may include a source resonator that transmits a wireless power, and the wireless power receiver may include a target resonator that receives a wireless power.

As shown, the wireless power transmitter using an in-band communication may include a power converting unit 110, a power amplifier 120, a matching controller 130, a source resonance unit 140, a source controller 150, and an in-band resonance unit 160.

The power converting unit 110 may be configured to receive energy from an external voltage supply to generate a resonance power. An electrical plug may be provided for instance. The power converting unit 110 may include an alternating current (AC)-to-AC (AC/AC) converter, an AC-to-direct current (DC) (AC/DC) converter, and/or a (DC/AC) inverter. The AC/AC converter may be configured to adjust, to a desired level, a signal level of an AC signal input from an external device. For example, The AC/DC converter may output a DC voltage at a predetermined level by rectifying an AC signal output from the AC/AC converter. The DC/AC inverter may generate an AC signal (i.e., in the band of a few megahertz (MHz) to tens of MHz) by quickly switching a DC voltage output from the AC/DC converter.

The power amplifying unit 120 may be configured to amplify the wireless power to a predetermined value. The predetermined value may be determined based on a transmission efficiency including noise and distortion that occurs in a wireless power transmission. The wireless power may be an AC power signal.

The matching controller 130 may set a resonance bandwidth of the source resonator or an impedance matching frequency of the source resonator. For example, the matching controller 130 may set, based on a control signal of the source controller 150, the resonance bandwidth of the source resonator and the impedance matching frequency of the source resonator.

In some embodiments, the matching controller 130 may include at least one of a source resonance bandwidth setting unit and a source matching frequency setting unit. The source resonance bandwidth setting unit may set the resonance bandwidth of the source resonator. The source matching frequency setting unit may set the impedance matching frequency of the source resonator. For example, a Q-factor of the source resonator may be determined based on a setting of the resonance bandwidth of the source resonator or a setting of the impedance matching frequency of the source resonator.

An impedance mismatch between the source resonator and the target resonator may occur due to an external effect, such as, for example, a change in a distance between the source resonator and the target resonator, a change in a location of at least one of the source resonator and the target resonator, and the like. The impedance mismatching may be a direct cause for a decrease in power transfer efficiency.

The matching controller 130 may detect a reflected wave corresponding to a transmission signal that is partially reflected and returned, may determine that impedance mismatching has occurred, and may perform impedance matching. For example, the matching controller 130 may determine, as the resonance frequency, a frequency having the minimum amplitude in a waveform of the reflected wave.

The source resonance unit 140 may include the source resonator that transmits the wireless power to in-band resonators, for example, via a magnetic coupling. Power may be wirelessly transmitted by a wave propagated by the source resonator. The source resonance unit 140 may include an array source resonator configured by forming an array of a plurality of source resonators, each of the plurality of in-band resonators transmitting a wireless power to a corresponding predetermined area. For example, the array may be formed to enable source resonator to be matched with one or more of the in-band resonators.

The magnetic coupling may include electromagnetic induction. The in-band resonator may use the same resonance frequency as a resonance frequency between the source resonator and the target resonator.

The in-band resonator may be located between the source resonator and the target resonator. The in-band resonator may transmit, to the target resonator, the wireless power received from the source resonator.

A coupling coefficient may be determined based on a mutual inductance between the source resonator and the target resonator, and the mutual induction may be determined based on the distance between the source resonator and the target resonator, and based on sizes of two resonators. When the in-band resonator is located between the source resonator and the target resonator, the coupling coefficient and the transmission efficiency, which are based on a wireless power transmission distance, may increase.

As the coupling coefficient between the source resonator and the target resonator increases, the wireless power transmission efficiency via the magnetic coupling may increase. A wireless power transmission distance (i.e., in which the source resonator is able to transmit the wireless power at more than a predetermined efficiency), may increase, when compared to a case that does not use the in-band resonator.

The in-band resonator may transmit data based on the same resonance frequency. The in-band resonator may transmit data based on an in-band communication. That is, the in-band communication may include transmission and reception of data with the wireless power receiver in a resonance frequency. An out-band communication may include transmission and reception of data with the resonance receiver via a frequency allocated for data communication.

The source controller 150 may be configured to control the impedance and the resonance frequency of the source resonator. The source controller 150 may receive identification information associated with the wireless power receiver via the in-band resonator. The source controller 150 may control, based on the identification information, the matching controller 130 to enable the impedance and the resonance frequency between the wireless power transmitter and the wireless power receiver to be matched. The identification information with respect to the wireless power receiver may include a location of the wireless power receiver, a charged level of a battery, information associated with whether charging is requested, an identification (ID), and/or the like.

The source controller 150 may detect an in-band resonator located in a location corresponding to the wireless power receiver among a plurality of in-band resonators. The source controller 150 may generate a control signal of the detected in-band resonator. The plurality of in-band resonators may form an array and may be located between the source resonator and the target resonator. Accordingly, the source controller 150 may detect the in-band resonator located in the location corresponding to the wireless power receiver including the target resonator. The source controller 150 may operate the detected in-band resonator, to transmit the wireless power to the target resonator.

The source controller 150 may receive reception data that is demodulated, from the in-band resonance unit 160, and may determine whether to charge the wireless power receiver. The source controller 150 may generate a control signal of the in-band resonator, to transmit the wireless power to the wireless power receiver determined to be charged, via the in-band resonator.

The in-band resonance unit 160 may be configured to receive and demodulate the identification information associated with the wireless power receiver, using in-band resonators. The in-band resonance unit 160 may simultaneously transmit the wireless power and transmission data via the in-band resonator corresponding to the wireless power receiver among the in-band resonators.

The transmission data may include data that the wireless power transmitter transmits to the wireless power receiver, and reception data may include data that the wireless power transmitter receives from the wireless power receiver.

For example, the transmission data may include an identification (ID) of the source resonator, an ID of the in-band resonator, a target resonator ID request signal requesting an ID of the target resonator, a wireless power receiver ID request signal requesting an ID of the wireless power receiver including the target resonator, state request information requesting the state information associated with the wireless power receiver, and/or the like. The reception data may include an acknowledgement (ACK) signal that indicates that the transmission data is received, the ID of the target resonator, the ID of the wireless power receiver including the target resonator, the state information associated with the wireless power receiver, a charging request signal, and/or the like.

The transmission data and the reception data may also include information to be used for impedance matching. The information to be used for impedance matching may include, for instance, the distance between the source resonator and the target resonator, a difference in load impedance between the source resonator and the target resonator, a reflection coefficient of a wave radiated from the source resonator to the target resonator, a power transmission gain, a coupling efficiency, and/or the like.

The in-band resonance unit 160 may include an array resonance unit 161, a modulator 163, a demodulator 165, and an in-band resonator controller 167.

The array resonance unit 161 may be configured as an array of the plurality of in-band resonators, with one or more of the plurality of in-band resonators configured to transmit a wireless power and transmission data to a corresponding predetermined area. For example, a predetermined area to which a wireless power is transmitted may be allocated for each of the plurality of in-band resonators.

The array resonance unit 161 may control one or more of the in-band resonators in the array to transmit the wireless power or may control several in-band resonators in the array to transmit the wireless power, based on a control signal of the in-band resonator controller 167.

The array resonance unit 161 may transmit transmission data that has been modulated by the modulator 163. The array resonance unit 161 may receive reception data from the wireless power receiver via the plurality of in-band resonators. The array resonance unit 161 may switch on a switch of an in-band resonator that transmits the wireless power among the plurality of in-band resonators, and may switch off switches of remaining in-band resonators that do not transmit a wireless power, based on the control signal of the in-band resonator controller 167.

The modulator 163 may modulate the transmission data by switching switches of the plurality of in-band resonators on and off. The in-band resonators included in the array may be located in different locations in the array. The modulator 163 may generate a signal having a different phase, by switching on and off of a switch of each in-band resonator, and thus, may generate an I/Q (in-phase/quadrature-phase) signal. The modulator 163 may control a switching operation of each in-band resonator based on the control signal of the in-band resonator controller 167. This process will be further described with reference to FIGS. 2 through 5.

The modulator 163 may modulate the transmission data by switching on and off several in-band resonators among the plurality of in-band resonators, for instance. The modulator 163 may also modulate the transmission data through the switching operation of the several in-band resonators. A number of modulation cases may be determined based on a number of in-band resonators.

In addition, the modulator 163 may perform analog modulation or digital modulation with respect to the transmission data by switching the switches of the plurality of in-band resonators on and off. The modulator 163 may control the switching operation of the in-band resonators to perform the digital modulation, for example, an amplitude shift keying (ASK) scheme, a frequency shift keying (FSK) scheme, and a phase shift keying (PSK) scheme. The modulator 163 may control the switching operation of the in-band resonators to perform the analog modulation, for example, using an amplitude modulation scheme, a frequency modulation scheme, a phase modulation scheme, or other modulation scheme.

The demodulator 165 may demodulate the reception data received from the wireless power receiver. The demodulator 165 may demodulate the reception data that is modulated and transmitted from the wireless power receiver. The demodulator 165 may demodulate the reception data in a reverse order of the modulation of the wireless power receiver. The demodulator 165 may transmit the demodulated reception data to the source controller 150.

The in-band resonator controller 167 may be configured to control the modulation of the transmission data and the demodulation of the reception data. The in-band resonator controller 167 may control the switching operation of the in-band resonator. The in-band resonator controller 167 may control the switching operation of the in-band resonator to modulate the transmission data based on the control signal generated by the source controller 150. The in-band resonator controller 167 may control the demodulator 165 to enable the demodulated reception data to be transmitted to the source controller 150.

In one or more embodiments, the source resonator, the in-band resonator, and/or the target resonator may be configured as a helix coil structured resonator, a spiral coil structured resonator, a meta-structured resonator, or the like.

One or more of the materials of the resonator embodiments disclosed herein may be metamaterials. An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability. The magnetic permeability may indicate a ratio between a magnetic flux density occurring with respect to a given magnetic field in a corresponding material and a magnetic flux density occurring with respect to the given magnetic field in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity According to an aspect, the metamaterial may be easily disposed in a resonance state without significant material size changes. This may be practical for a relatively large wavelength area or a relatively low frequency area, for instance.

The source resonator, the in-band resonator, and the target resonator in a wireless power transmission and reception system using an in-band communication may be configured as a structure described with reference to FIGS. 10 through 17.

Figure 2:
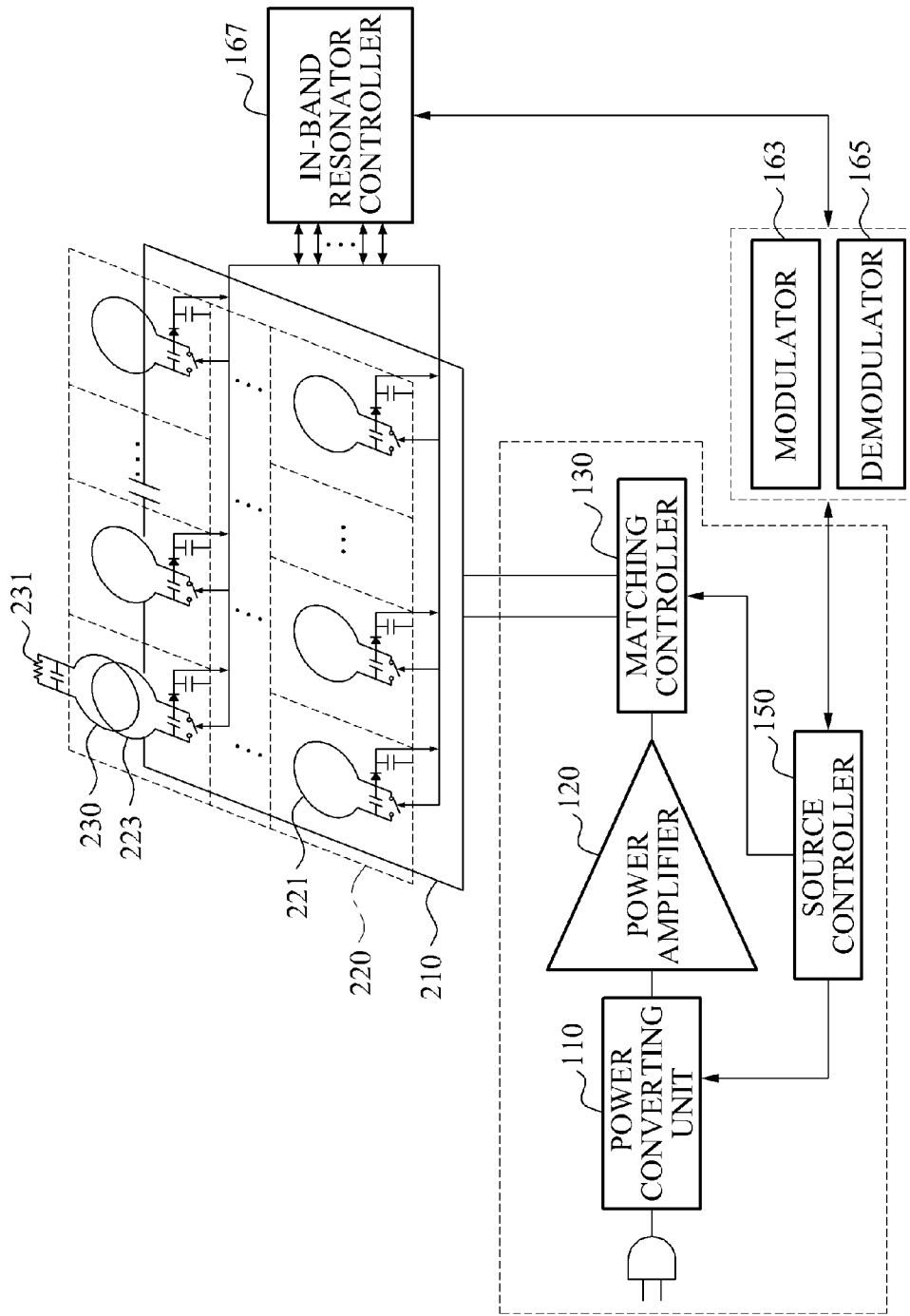
FIG. 2 is a diagram illustrating an in-band resonance unit.

FIG. 2 illustrates an in-band resonance unit.

Referring to FIG. 2, a source resonator 210 may transmit, to an in-band resonance unit 220, a wireless power of which an impedance and resonance frequency is matched via a matching controller 130.

The in-band resonance unit 220 may include an array resonance unit having an array of in-band resonators 221 and 223. The in-band resonator 221 and the in-band resonator 223 may receive a wireless power from the source resonator 210. The in-band resonator 223 may transmit the wireless power to a target resonator 230. The target resonator 230 may transmit the received wireless power to a load 231 to charge the load.

As shown, the in-band resonator controller 167 may switch on a switch of the in-band resonator 223 corresponding to a location where the target resonator 230 is located.

The modulator 163 may modulate transmission data that requests identification information from the wireless power receiver. The in-band resonator 221 and the in-band resonator 223 may transmit transmission data that is modulated. The in-band resonator 223 may receive, from the target resonator 230, reception data including the identification information.

The demodulator 165 may demodulate the reception data including the identification information. The source controller 150 may determine, based on the demodulated reception data, a location of the target resonator 230 and the in-band resonator 223 corresponding to the target resonator 230.

The source controller 150 may generate a control signal to enable the wireless power be transmitted via the in-band resonator 223. The in-band resonator controller 167 may control a switching operation of the in-band resonator 223, based on the control signal. Therefore, a wireless power transmitter may transmit a wireless power using an in-band resonator corresponding to a target resonator.

The wireless power transmitter may distribute a predetermined wireless power using a source resonator, based on a time, to enable the predetermined wireless power to be transmitted to a plurality of in-band resonators. Thus, the plurality of wireless power receivers may be charged. The plurality of wireless power receivers may be charged with a relatively small amount of wireless power and thus, a power loss caused by a high frequency harmonic in the wireless power transmitter may decrease.

The wireless power transmitter may transmit the wireless power using an in-band resonator and thus, may increase a range of transmission of the wireless power. As a distance between a resonator transmitting a wireless power and a resonator receiving a wireless power decreases, a coupling coefficient increases.

As the coupling coefficient increases, wireless power transmission efficiency increases accordingly. Therefore, when a source resonator is assumed to transmit the same wireless power as a conventional case, transmission efficiency may increase and a range of transmission may increase through an in-band resonator, as compared with the conventional case.

Figure 3:
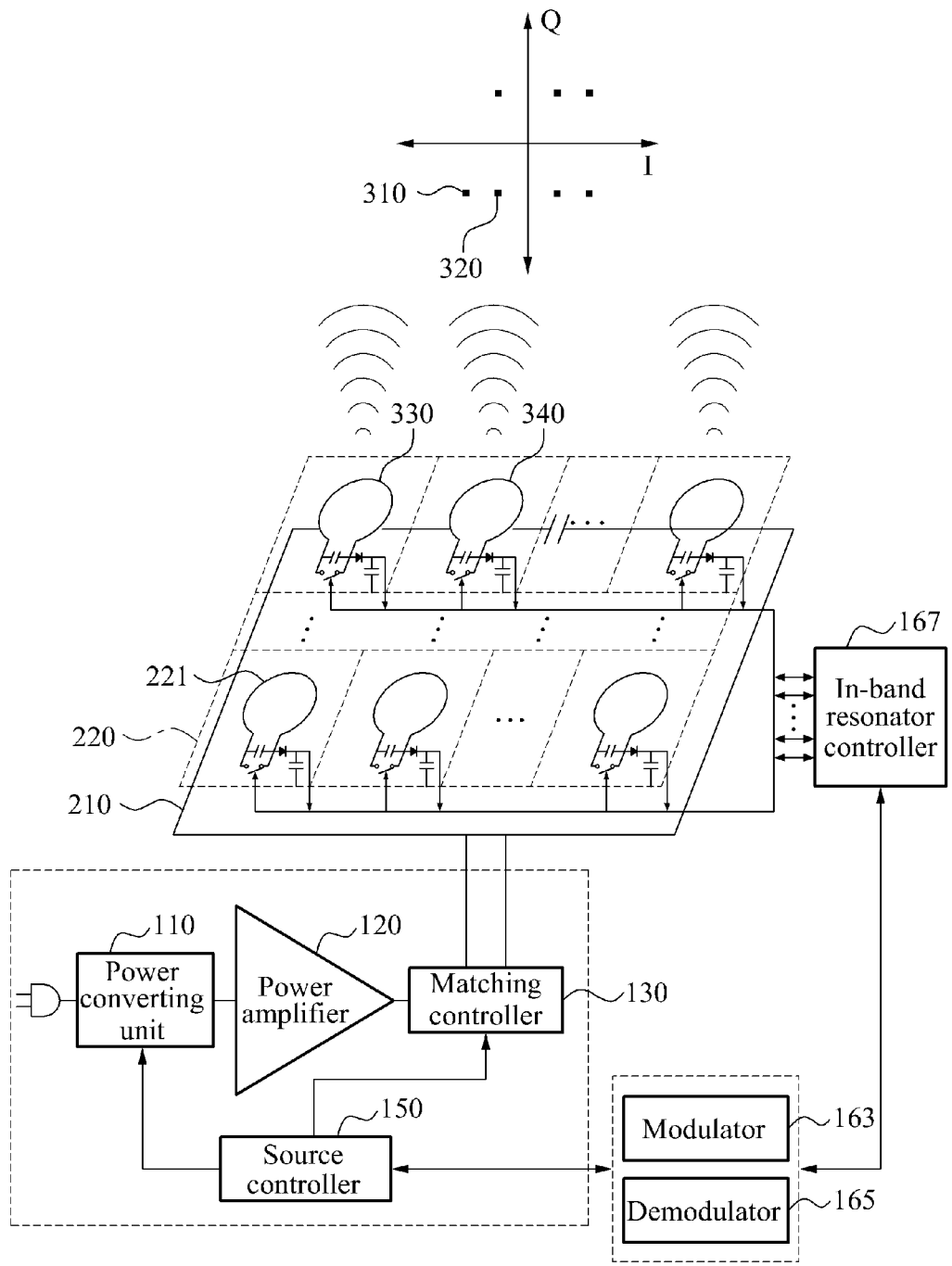
FIG. 3 is a diagram illustrating modulation using an in-band resonator.

FIG. 3 illustrates modulation using an in-band resonator.

Referring to FIG. 3, a signal that is modulated by an on and off operation of switches of in-band resonators 330 and 340 may be marked with points 310 and 320, respectively, on a graph associated with an I/Q signal. Locations of a plurality of in-band resonators included in an array resonance unit may be different from each other. Therefore, a magnitude and a phase of a signal that is modulated in each in-band resonator by a switching operation may be different. In general, a local oscillator may be used to generate an I/Q signal. In a case of an in-band resonance unit, for example, the I/Q signal may be generated by performing a switching operation of the in-band resonator.

Figure 4:
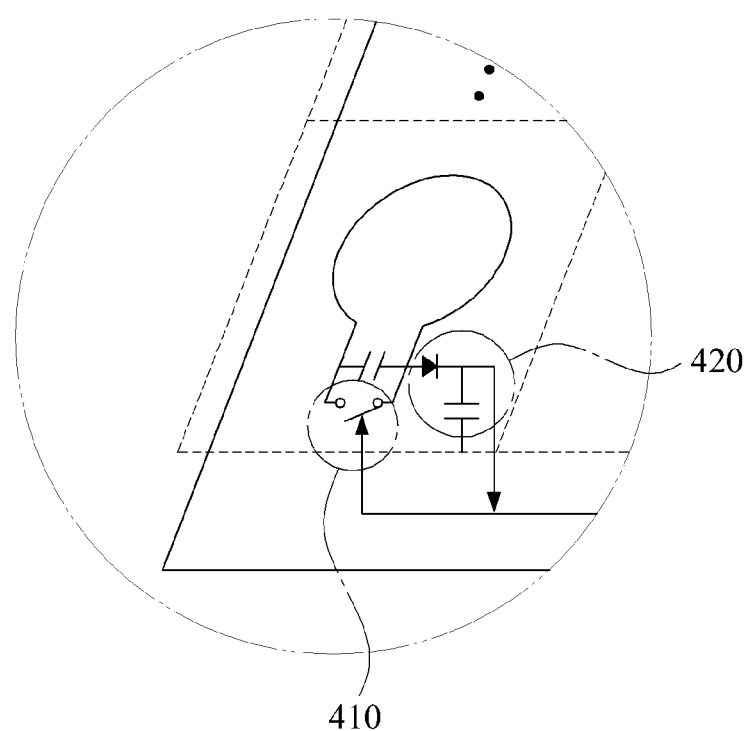
FIG. 4 is a diagram illustrating modulation and demodulation of an in-band resonator.

FIG. 4 illustrates modulation and demodulation of an in-band resonator.

The modulator 163 may modulate transmission data by switching operation 410 of an in-band resonator 420. The transmission data may be modulated based on whether a switch of the in-band resonator is switched on and off. The demodulator 165 may perform DC rectification with respect to reception data, and may restore a modulated signal to demodulate reception data.

Figure 5:
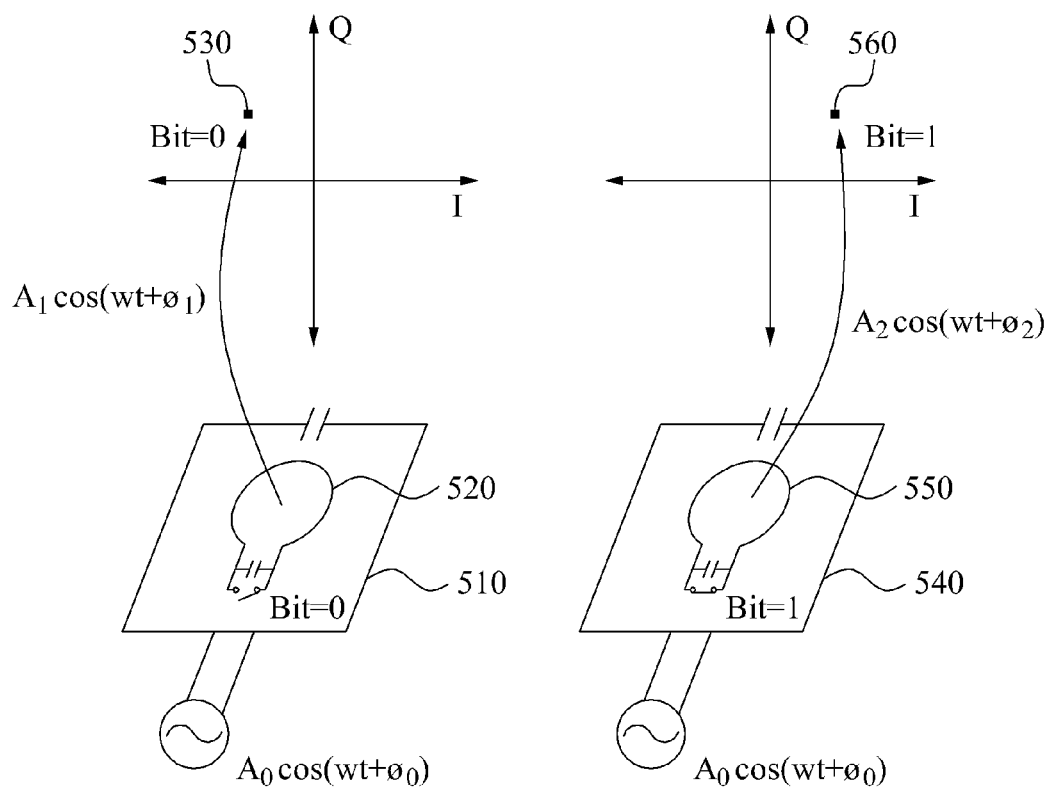
FIG. 5 is a diagram illustrating modulation of transmission data using an in-band resonator.

FIG. 5 illustrates modulation of transmission data using an in-band resonator.

A first source resonator 510 may transmit a wireless power. The wireless power may be a sinusoidal wave that has an amplitude of $A_0$ and a phase of $\phi_0$, when a switch of the in-band resonator 520 is switched off. When the wireless power is expressed as a bit, the bit may be '0'. In this example, data modulated to '0' may have an amplitude of $A_1$ and a phase of $\phi_1$. The amplitude of $A_1$ and the phase of $\phi_1$ may be different based on a location of an in-band resonator 520 in an array. The modulated data including the amplitude and the phase may be expressed as a point 530 on an I/Q signal graph.

A second source resonator 540 may transmit a wireless power. The wireless power may be a sinusoidal wave that has an amplitude of $A_0$ and a phase of $\phi_0$, when a switch of the in-band resonator 550 is switched on. When the wireless power is expressed as a bit, the bit may be '1'. In this example, data modulated to '1' may have an amplitude of $A_2$ and a phase of $\phi_2$. The amplitude of $A_2$ and the phase of $\phi_2$ may be different based on a location of an in-band resonator 550 in an array. The modulated data including the amplitude and the phase may be expressed as a point 560 on an I/Q signal graph.

The modulator 163 may modulate transmission data by performing a switching operation of each in-band resonator. For example, when two in-band resonators are used, the modulator 163 may modulate the transmission data into four cases, for example, 00, 01, 10, and 11.

Figure 6:
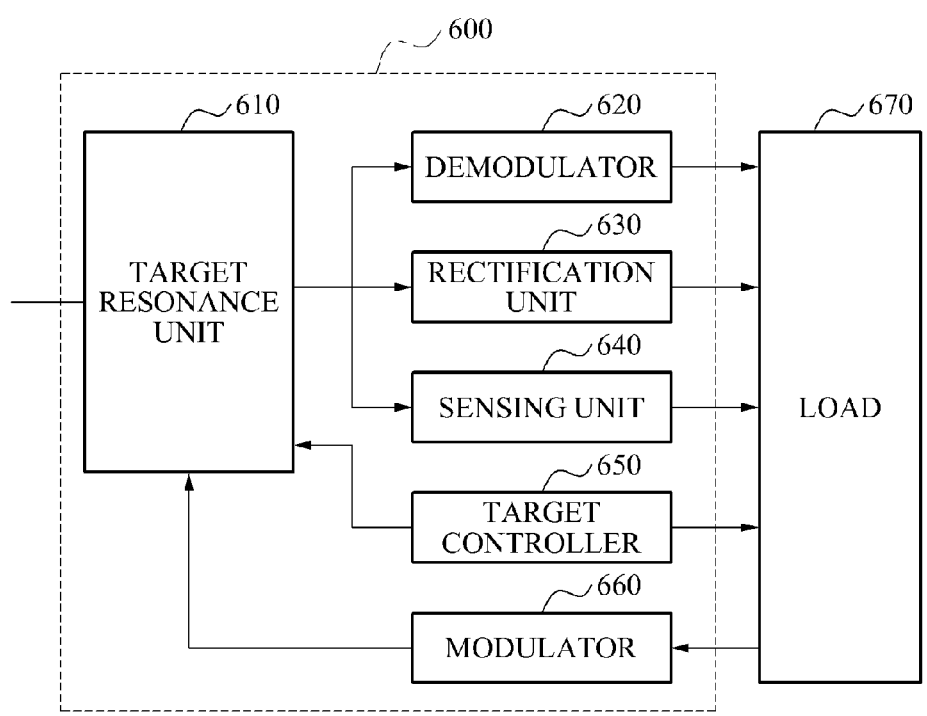
FIG. 6 is a block diagram illustrating a wireless power receiver using an in-band communication.

FIG. 6 illustrates a wireless power receiver 600 using an in-band communication.

The wireless power receiver 600 using the in-band communication may include a target resonance unit 610, a demodulator 620, a rectification unit 630, a sensing unit 640, a target controller 650, and a modulator 660.

The target resonance unit 610 may receive, from an in-band resonator, a wireless power and reception data including a wake-up signal. The wake-up signal may include a minimal power signal used when a target resonator transmits transmission data.

The target resonance unit 610 may receive, from the in-band resonator, the wireless power and the reception data via the target resonator. The reception data may include data that the wireless power receiver 600 receives from a wireless power transmitter, the transmission data may include data that the wireless power receiver 600 transmits to the wireless power transmitter.

The reception data may include an ID of a source resonator, an ID of the in-band resonator, a target resonator ID request signal requesting an ID of the target resonator, a wireless power receiver ID request signal requesting an ID of the wireless power receiver including the target resonator, a state request information requesting state information associated with the wireless power receiver, and/or the like. The transmission data may include an ACK signal indicating the reception data is received, the ID of the target resonator, the ID of the wireless power receiver including the target resonator, the state information associated with the wireless power receiver, a charging request signal, and/or the like.

The target resonance unit 610 may transmit the transmission data that is modulated by the modulator 660, to the in-band resonator.

The demodulator 620 may demodulate the reception data including the wake-up signal. The demodulator 620 may demodulate the reception data that is modulated through the in-band resonator. The wireless power receiver 600 may transmit, based on the demodulated reception data, identification information associated with the wireless power receiver 600 to the wireless power transmitter. The identification information associated with the wireless power receiver 600 may include a location of the wireless power receiver 600, a charged level of a battery, information associated with whether charging is requested, an ID, and/or the like.

The rectification unit 630 may include a rectifier that is configured to rectify the wireless power received via the target resonator to a DC voltage. The rectified DC voltage may be transmitted to the load 670, and may charge the load 670. The rectification unit 630 may include an AC-DC converter and a DC-DC converter, for example. The AC-DC converter may generate a DC signal by rectifying an AC signal received by the target resonator, and the DC-DC converter may adjust a signal level of the DC signal and may supply a rated voltage to a device or the load 670.

The sensing unit 640 may be configured to determine or sense a reflected wave of the wireless power received via the target resonator. Information associated with the sensed reflected wave of the wireless power may be transmitted to the target controller 650. The target controller 650 may perform, based on the information associated with the sensed reflected wave, impedance matching and resonance matching between, the target resonator, the in-band resonator, and the source resonator.

The target controller 650 may control the impedance to perform impedance matching between the source resonator, the in-band resonator, and an awoken target resonator. The target controller 650 may set at least one of a resonance bandwidth of the target resonator and an impedance matching frequency of the target resonator.

In some embodiments, the target controller 650 may include at least one of a target resonance bandwidth setting unit and a target matching frequency setting unit. The target resonance bandwidth setting unit may set the resonance bandwidth of the target resonator. The target matching frequency setting unit may set the impedance matching frequency of the target resonator. For example, a Q-factor of the target resonator may be determined based on a setting of the resonance bandwidth of the target resonator or a setting of the impedance matching frequency of the target resonator.

The modulator 660 may modulate the transmission data including a response signal with respect to the wake-up signal, a charging request signal, and an ID of the awoken target.

And, in some embodiments, the wireless power receiver 600 may further include a power determining unit that determines, based on the reception data, whether the wireless power receiver is awoken and whether to charge the load.

Figure 7:
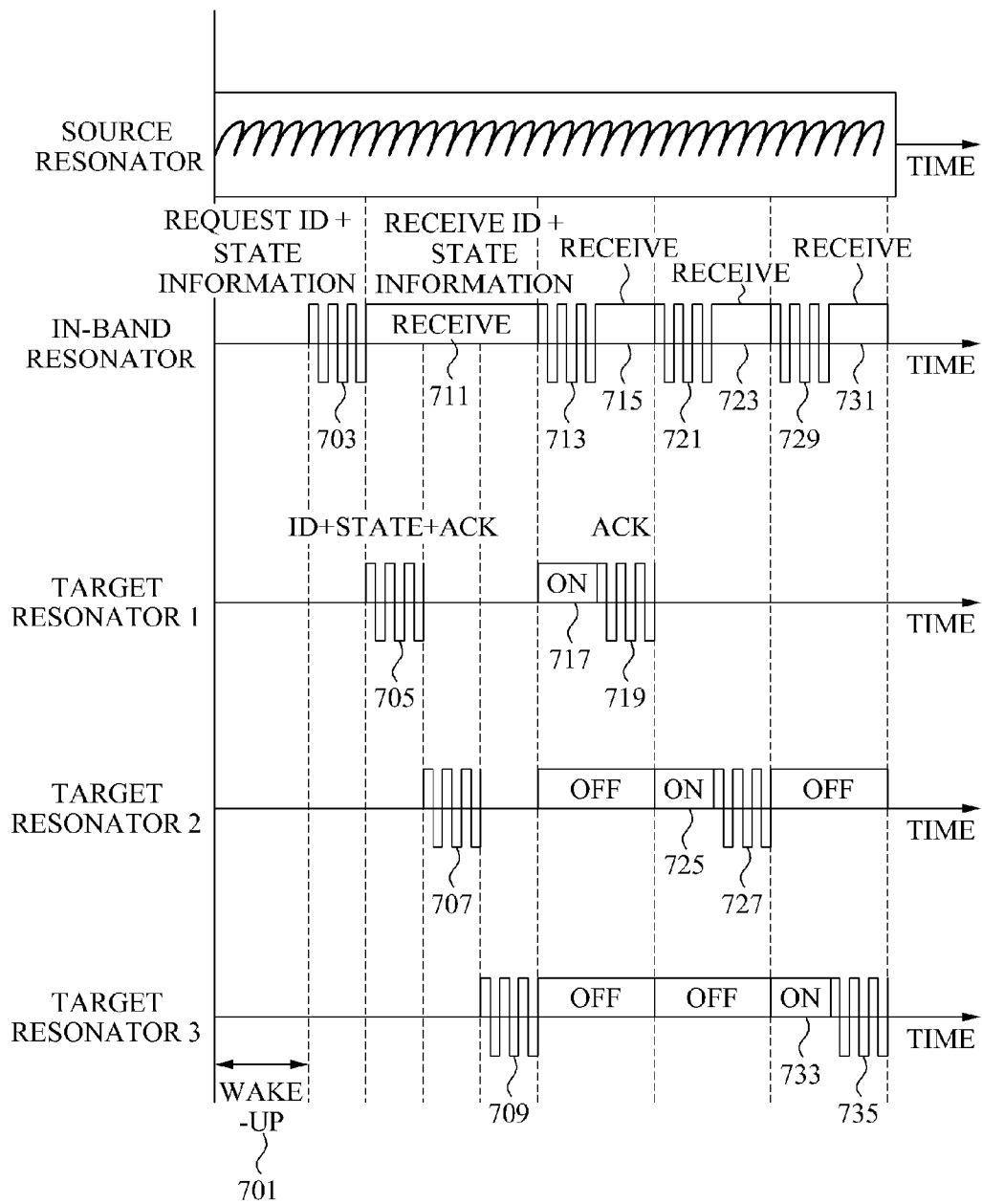
FIG. 7 is a diagram illustrating flow of a wireless power and data among a source resonator, an in-band resonator, a target resonator.

FIG. 7 is a diagram illustrating flow of a wireless power and data among a source resonator, an in-band resonator, and a target resonator.

As shown in the top portions of FIG. 7, the source resonator may continuously transmit the wireless power over time. For example, wireless power of the source resonator may be transmitted to an in-band resonator. The wireless power may be directly transmitted to the target resonator.

Initial wireless power of the source resonator may be a wake-up power signal 701 to awaken the in-band resonator, a target resonator 1, a target resonator 2, and a target resonator 3. The wake-up power signal may include a minimal power signal used when a resonator transmits and receives data. When the in-band resonator is awoken, the in-band resonator may modulate and transmit transmission data 703. The transmission data 703 may include an ID of the source resonator, an ID of the in-band resonator, a target resonator ID request signal requesting an ID of the target resonator, a wireless power receiver ID request signal requesting an ID of a wireless power receiver, a state request information requesting state information associated with the wireless power receiver, and/or the like.

The target resonator 1 may receive the transmission data from the corresponding in-band resonator, and may transmit data 705 including an ACK signal indicating that the transmission data is received, an ID of the target resonator 1, an ID of a wireless power receiver including the target resonator 1, state information associated with the wireless power receiver, a charging request signal, and/or the like.

The target resonator 2 may receive the transmission data from the corresponding in-band resonator, and may transmit data 707 including an ACK signal indicating that the transmission data is received, an ID of the target resonator 2, an ID of a wireless power receiver including the target resonator 2, state information associated with the wireless power receiver, a charging request signal, and/or the like.

The target resonator 3 may receive the transmission data from the corresponding in-band resonator, and may transmit data 709 including an ACK signal indicating that the transmission data is received, an ID of the target resonator 3, an ID of a wireless power receiver including the target resonator 3, state information associated with the wireless power receiver, a charging request signal, and/or the like.

The in-band resonator may receive reception data 711 including an ID of a corresponding target resonator, state information associated with a corresponding wireless power receiver, and a charging request signal, from the target resonator 1, the target resonator 2, and the target resonator 3.

An in-band resonator located in a location corresponding to the target resonator 1 may transmit transmission data 713 and a wireless power. The target resonator 1 may perform reception 717 of the wireless power, and may charge a load 1. When the charging of the load 1 is completed, the target resonator 1 may transmit a completion signal 719 to the corresponding in-band resonator. The corresponding in-band resonator may perform reception 715 of the completion signal 719. For example, switches of in-band resonators located in locations respectively corresponding to the target resonator 2 and the target resonator 3 may be switched off and thus, the target resonator 2 and the target resonator 3 may not receive the wireless power.

An in-band resonator located in a location corresponding to the target resonator 2 may transmit transmission data 715 and a wireless power. The target resonator 2 may perform reception 725 of the wireless power, and may charge a load 2. When the charging of the load 2 is completed, the target resonator 2 may transmit a completion signal 727 to the corresponding in-band resonator. The corresponding in-band resonator may perform reception 723 of the completion signal 727. For example, switches of in-band resonators located in locations respectively corresponding to the target resonator 1 and the target resonator 3 may be switched off and thus, the target resonator 1 and the target resonator 3 may not receive the wireless power.

An in-band resonator located in a location corresponding to the target resonator 3 may transmit transmission data 729 and a wireless power. The target resonator 3 may perform reception 733 of the wireless power, and may charge a load 3. When the charging of the load 3 is completed, the target resonator 3 may transmit a completion signal 735 to the corresponding in-band resonator. The corresponding in-band resonator may perform reception 731 of the completion signal 735. For example, switches of in-band resonators located in locations corresponding to the target resonator 1 and the target resonator 2 respectively may be switched off and thus, the target resonator 1 and the target resonator 2 may not receive the wireless power.

The wireless power transmitter may control an in-band resonator located in a location corresponding to the target resonator, to transmit a wireless power and transmission data. For example, the wireless power transmitter may transmit a wireless power to the target resonator 1, the target resonator 2, and the target resonator 3, at regular intervals and thus, may provide an effect that may be obtained when the wireless power is continuously transmitted, on average. Therefore, a plurality of wireless power receivers may be charged with a relatively small amount of power supply.

Figure 8:
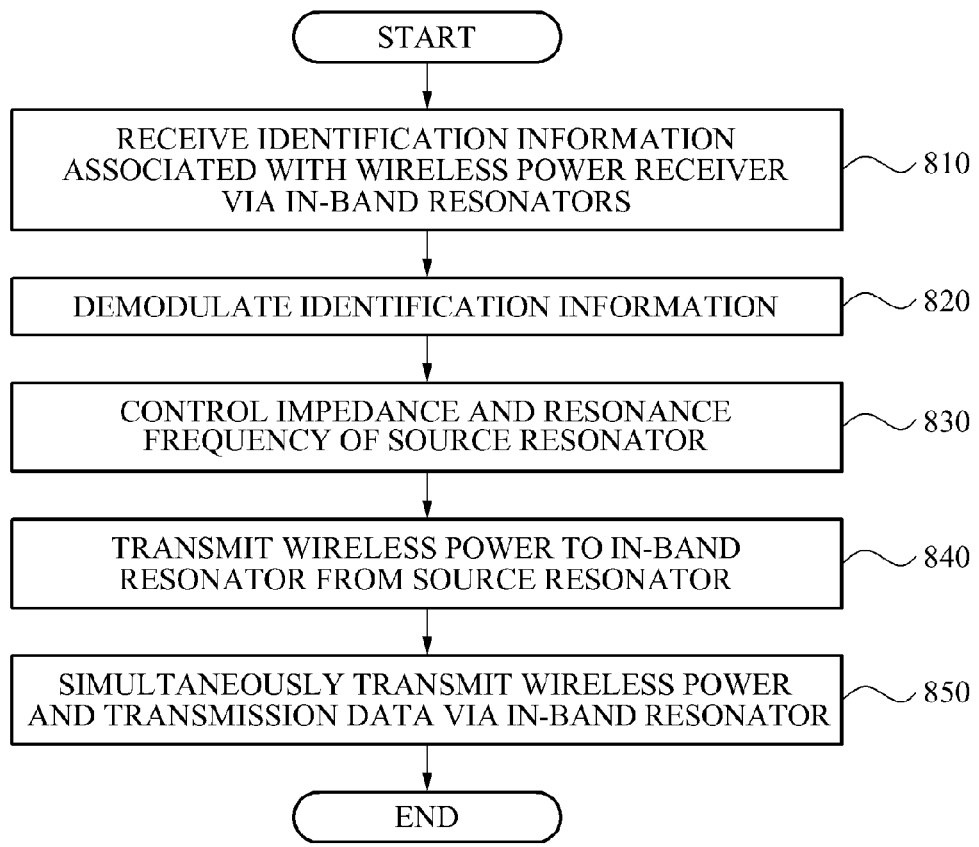
FIG. 8 is a flowchart illustrating a wireless power transmission method using an in-band communication.

FIG. 8 illustrates a wireless power transmission method using an in-band communication.

In operation 810, a wireless power transmitter using the in-band communication may receive identification information associated with a wireless power receiver, via in-band resonators. An in-band resonator may receive, from the wireless power receiver, the identification information based on the in-band communication. The in-band communication may include transmission and reception of data with the wireless power receiver in a resonance frequency. For example, the identification information associated with the wireless power receiver may include a location of the wireless power receiver, a charged level of a battery, information associated with whether charging is requested, an ID, and/or the like.

In operation 820, the wireless power transmitter may modulate the received identification information. The wireless power transmitter using the in-band communication may demodulate reception data in a reverse order of the modulation of the wireless power receiver.

In operation 830, the wireless power transmitter may control, based on the demodulated identification information, the impedance and the resonance frequency of a source resonator.

In operation 840, the wireless power transmitter may transmit a wireless power from the source resonator to the in-band resonators via a magnetic coupling. Power may be wirelessly transmitted by a wave propagated by the source resonator, for instance.

In operation 850, the wireless power transmitter may simultaneously transmit the wireless power and the transmission data via an in-band resonator corresponding to the wireless power receiver among the in-band resonators. The wireless power transmitter using the in-band communication may control the in-band resonators (e.g., by switching the plurality of in-band resonators on and off), to modulate the transmission data.

In turn, the wireless power transmitter may be configured to demodulate reception data received from the wireless power receiver.

The wireless power transmitter may be configured to transmit the wireless power and the transmission data to a predetermined area, for example, via an array of in-band resonators. The wireless power transmitter may detect an in-band resonator located in a location corresponding to the wireless power receiver among the in-band resonators.

The wireless power transmitter may generate a control signal of the detected in-band resonator.

The wireless power transmitter may transmit the wireless power to a target resonator, based on the control signal of the detected in-band resonator.

Figure 9:
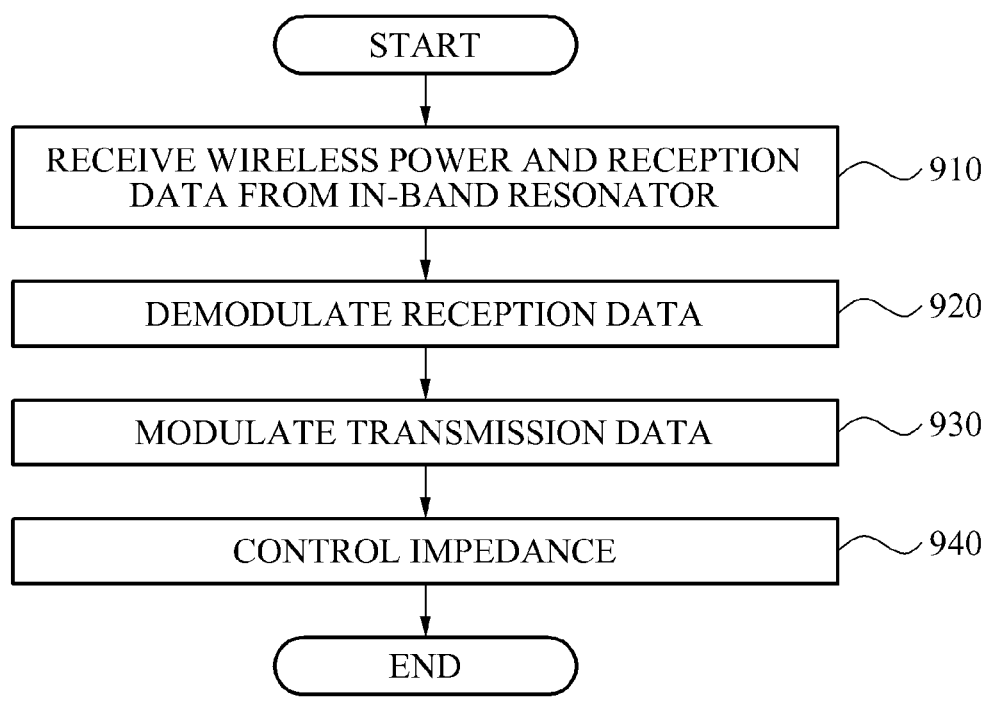
FIG. 9 is a flowchart illustrating a wireless power reception method using an in-band communication.

FIG. 9 illustrates a wireless power reception method using an in-band communication.

In operation 910, a wireless power receiver using an in-band communication may receive, from an in-band resonator, a wireless power and reception data including a wake-up signal, for instance, via a magnetic coupling. The wake-up signal may include a minimal power signal used when a target resonator transmits transmission data. In operation 920, the wireless power receiver may demodulate the reception data including the wake-up signal. The wireless power receiver may demodulate the reception data that is modulated through the in-band resonator.

In operation 930, the wireless power receiver may modulate transmission data including a response signal with respect to the wake-up signal, a charging request signal, an ID of an awoken target resonator.

In operation 940, the wireless power receiver may control the impedance to perform impedance matching the source resonator, the in-band resonator, and the awoken target resonator.

The wireless power receiver may determine, based on the reception data, whether the target resonator is awoken and whether to charge a load.

Figure 10:
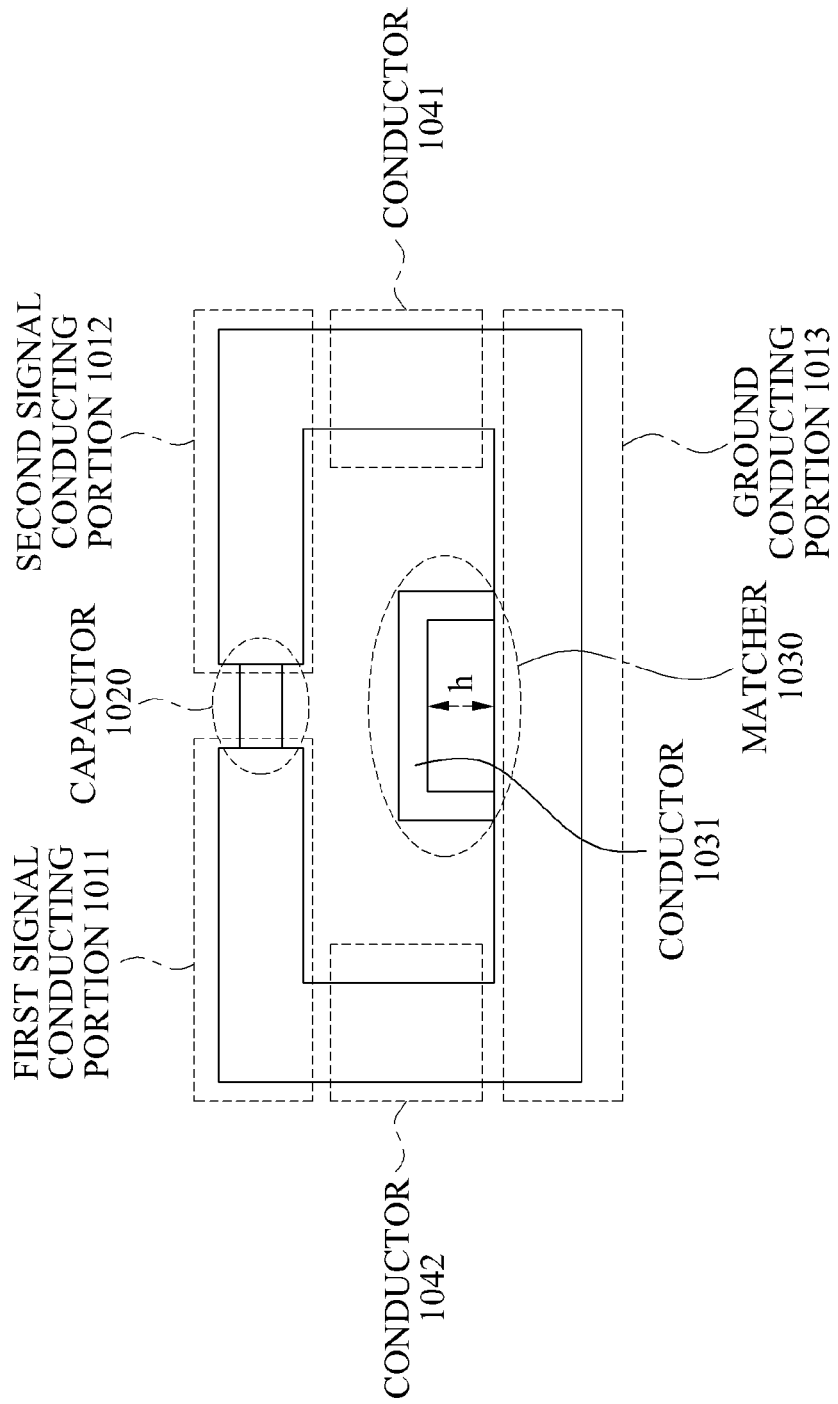
FIG. 10 is a diagram illustrating a resonator having a two-dimensional (2D) structure.

FIG. 10 illustrates a resonator 1000 having a two-dimensional (2D) structure.

As shown, the resonator 1000 having the 2D structure may include a transmission line, a capacitor 1020, a matcher 1030, and conductors 1041 and 1042. The transmission line may include, for instance, a first signal conducting portion 1011, a second signal conducting portion 1012, and a ground conducting portion 1013.

The capacitor 1020 may be inserted or otherwise positioned in series between the first signal conducting portion 1011 and the second signal conducting portion 1012 so that an electric field may be confined within the capacitor 1020. In various implementations, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. As shown in FIG. 10, the resonator 1000 may be configured to have a generally 2D structure. The transmission line may include the first signal conducting portion 1011 and the second signal conducting portion 1012 in the upper portion of the transmission line, and may include the ground conducting portion 1013 in the lower portion of the transmission line. As shown, the first signal conducting portion 1011 and the second signal conducting portion 1012 may be disposed to face the ground conducting portion 1013 with current flowing through the first signal conducting portion 1011 and the second signal conducting portion 1012.

In some implementations, one end of the first signal conducting portion 1011 may be electrically connected (i.e., shorted) to the conductor 1142, and another end of the first signal conducting portion 1011 may be connected to the capacitor 1020. And one end of the second signal conducting portion 1012 may be grounded to the conductor 1041, and another end of the second signal conducting portion 1012 may be connected to the capacitor 1020. Accordingly, the first signal conducting portion 1011, the second signal conducting portion 1012, the ground conducting portion 1013, and the conductors 1041 and 1042 may be connected to each other such that the resonator 1000 may have an electrically "closed-loop structure." The term "closed-loop structure" as used herein, may include a polygonal structure, for example, a circular structure, a rectangular structure, or the like that is electrically closed. The capacitor 1020 may be inserted into an intermediate portion of the transmission line. For example, the capacitor 1020 may be inserted into a space between the first signal conducting portion 1011 and the second signal conducting portion 1012. The capacitor 1020 may be configured, in some instances, as a lumped element, a distributed element, or the like. In one implementation, a distributed capacitor may be configured as a distributed element and may include zigzagged conductor lines and a dielectric material having a relatively high permittivity between the zigzagged conductor lines.

When the capacitor 1020 is inserted into the transmission line, the resonator 1000 may have a property of a metamaterial, as discussed above. For example, the resonator 1000 may have a negative magnetic permeability due to the capacitance of the capacitor 1020. If so, the resonator 1000 may be referred to as a mu negative (MNG) resonator. Various criteria may be applied to determine the capacitance of the capacitor 1020. For example, the various criteria for enabling the resonator 1000 to have the characteristic of the metamaterial may include one or more of the following: a criterion for enabling the resonator 1000 to have a negative magnetic permeability in a target frequency, a criterion for enabling the resonator 1000 to have a zeroth order resonance characteristic in the target frequency, or the like.

The resonator 1000, also referred to as the MNG resonator 1000, may also have a zeroth order resonance characteristic (i.e., having, as a resonance frequency, a frequency when a propagation constant is "0"). If the resonator 1000 has a zeroth order resonance characteristic, the resonance frequency may be independent with respect to a physical size of the MNG resonator 1000. Moreover, by appropriately designing the capacitor 1020, the MNG resonator 1000 may sufficiently change the resonance frequency without substantially changing the physical size of the MNG resonator 1000 may not be changed.

In a near field, for instance, the electric field may be concentrated on the capacitor 1020 inserted into the transmission line. Accordingly, due to the capacitor 1020, the magnetic field may become dominant in the near field. In one or more embodiments, the MNG resonator 1000 may have a relatively high Q-factor using the capacitor 1020 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 1000 may include a matcher 1030 for impedance matching. For example, the matcher 1030 may be configured to appropriately determine and adjust the strength of a magnetic field of the MNG resonator 1000, for instance. Depending on the configuration, current may flow in the MNG resonator 1000 via a connector, or may flow out from the MNG resonator 1000 via the connector. The connector may be connected to the ground conducting portion 1013 or the matcher 1030. In some instances, the power may be transferred through coupling without using a physical connection between the connector and the ground conducting portion 1013 or the matcher 1030.

As shown in FIG. 10, the matcher 1030 may be positioned within the loop formed by the loop structure of the resonator 1000. The matcher 1030 may adjust the impedance of the resonator 1000 by changing the physical shape of the matcher 1030. For example, the matcher 1030 may include the conductor 1031 for the impedance matching positioned in a location that is separate from the ground conducting portion 1013 by a distance h. Accordingly, the impedance of the resonator 1000 may be changed by adjusting the distance h.

In some instances, a controller may be provided to control the matcher 1030 which generates and transmits a control signal to the matcher 1030 directing the matcher to change its physical shape so that the impendence of the resonator may be adjusted. For example, the distance h between the conductor 1031 of the matcher 1030 and the ground conducting portion 1013 may be increased or decreased based on the control signal. The controller may generate the control signal based on various factors.

As shown in FIG. 10, the matcher 1030 may be configured as a passive element such as the conductor 1031, for example. Of course, in other embodiments, the matcher 1030 may be configured as an active element such as a diode, a transistor, or the like. If the active element is included in the matcher 1030, the active element may be driven based on the control signal generated by the controller, and the impedance of the resonator 1000 may be adjusted based on the control signal. For example, when the active element is a diode included in the matcher 1030 the impedance of the resonator 1000 may be adjusted depending on whether the diode is in an on state or in an off state.

In some instances, a magnetic core may be further provided to pass through the MNG resonator 1000. The magnetic core may perform a function of increasing a power transmission distance.

Figure 11:
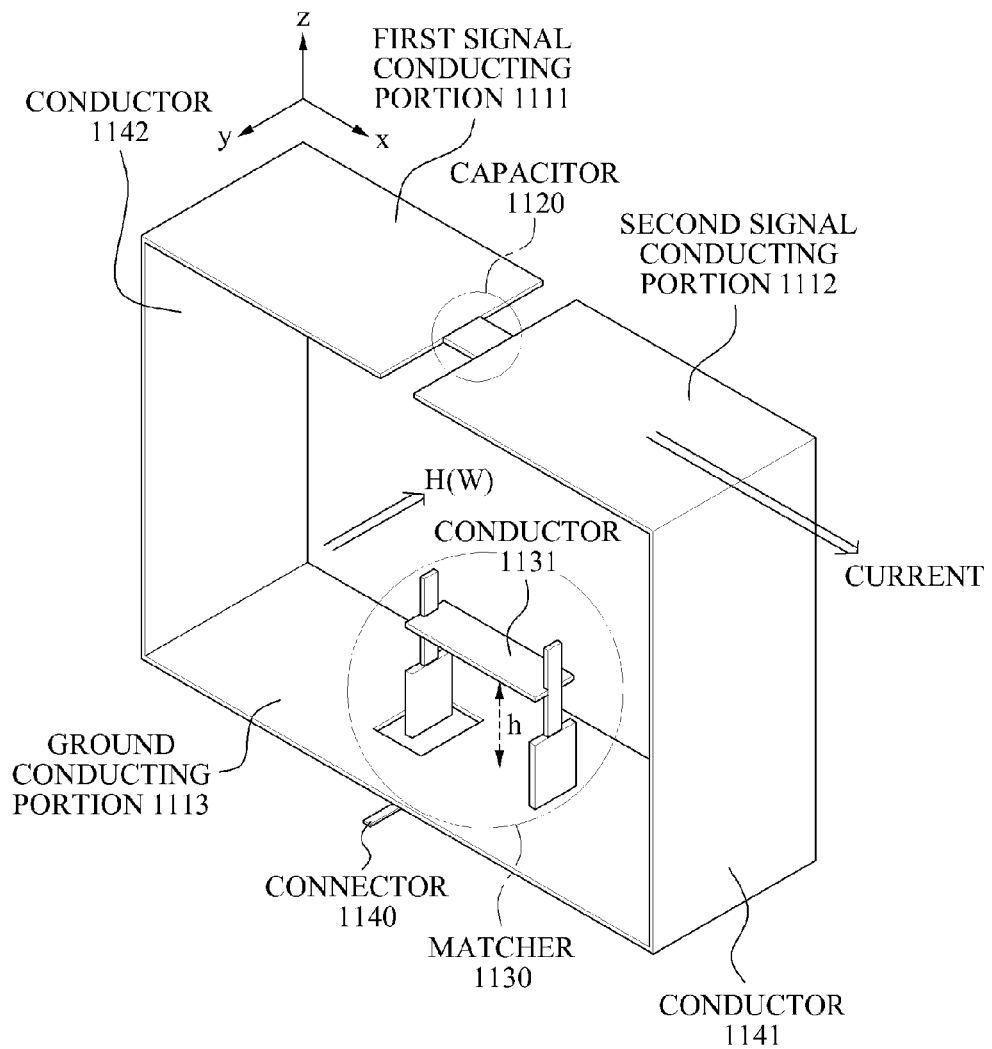
FIG. 11 is a diagram illustrating a resonator having a three-dimensional (3D) structure.

FIG. 11 illustrates a resonator 1100 having a three-dimensional (3D) structure.

Referring to FIG. 11, the resonator 1100 having the 3D structure may include a transmission line and a capacitor 1120. The transmission line may include a first signal conducting portion 1111, a second signal conducting portion 1112, and a ground conducting portion 1113. The capacitor 1120 may be inserted, for instance, in series between the first signal conducting portion 1111 and the second signal conducting portion 1112 of the transmission link such that an electric field may be confined within the capacitor 1120.

As shown in FIG. 11, the resonator 1100 may have a generally 3D structure. The transmission line may include the first signal conducting portion 1111 and the second signal conducting portion 1112 in an upper portion of the resonator 1100, and may include the ground conducting portion 1113 in a lower portion of the resonator 1100. The first signal conducting portion 1111 and the second signal conducting portion 1112 may be disposed to face the ground conducting portion 1113. In this arrangement, current may flow in an x direction through the first signal conducting portion 1111 and the second signal conducting portion 1112. Due to the current, a magnetic field H(W) may be formed in a −y direction. However, it will be appreciated that the magnetic field H(W) might also be formed in the opposite direction (e.g., a +y direction) in other implementations.

In one or more embodiments, one end of the first signal conducting portion 1111 may be electrically connected (i.e., shorted) to a conductor 1142, and another end of the first signal conducting portion 1111 may be connected to the capacitor 1120. One end of the second signal conducting portion 1112 may be grounded to a conductor 1141, and another end of the second signal conducting portion 1112 may be connected to the capacitor 1120. Accordingly, the first signal conducting portion 1111, the second signal conducting portion 1112, the ground conducting portion 1113, and the conductors 1141 and 1142 may be connected to each other, whereby the resonator 1100 may have an electrically closed-loop structure As shown in FIG. 11, the capacitor 1120 may be inserted or otherwise positioned between the first signal conducting portion 1111 and the second signal conducting portion 1112. For example, the capacitor 1120 may be inserted into a space between the first signal conducting portion 1111 and the second signal conducting portion 1112. The capacitor 1120 may include, for example, a lumped element, a distributed element, and the like. In one implementation, a distributed capacitor having the shape of the distributed element may include zigzagged conductor lines and a dielectric material having a relatively high permittivity positioned between the zigzagged conductor lines.

When the capacitor 1120 is inserted into the transmission line, the resonator 1100 may have a property of a metamaterial, in some instances, as discussed above.

For example, when a capacitance of the capacitor inserted is a lumped element, the resonator 1100 may have the characteristic of the metamaterial. When the resonator 1100 has a negative magnetic permeability by appropriately adjusting the capacitance of the capacitor 1120, the resonator 1100 may also be referred to as an MNG resonator. Various criteria may be applied to determine the capacitance of the capacitor 1120. For example, the various criteria may include, for instance, one or more of the following: a criterion for enabling the resonator 1100 to have the characteristic of the metamaterial, a criterion for enabling the resonator 1100 to have a negative magnetic permeability in a target frequency, a criterion enabling the resonator 1100 to have a zeroth order resonance characteristic in the target frequency, or the like. Based on at least one criterion among the aforementioned criteria, the capacitance of the capacitor 1120 may be determined.

The resonator 1100, also referred to as the MNG resonator 1100, may have a zeroth order resonance characteristic (i.e., having, as a resonance frequency, a frequency when a propagation constant is "0"). If the resonator 1100 has a zeroth order resonance characteristic, the resonance frequency may be independent with respect to a physical size of the MNG resonator 1100. Thus, by appropriately designing the capacitor 1120, the MNG resonator 1100 may sufficiently change the resonance frequency without substantially changing the physical size of the MNG resonator 1100 may not be changed.

Referring to the MNG resonator 1100 of FIG. 11, in a near field, the electric field may be concentrated on the capacitor 1120 inserted into the transmission line. Accordingly, due to the capacitor 1120, the magnetic field may become dominant in the near field. And, since the MNG resonator 1100 having the zeroth-order resonance characteristic may have characteristics similar to a magnetic dipole, the magnetic field may become dominant in the near field. A relatively small amount of the electric field formed due to the insertion of the capacitor 1120 may be concentrated on the capacitor 1120 and thus, the magnetic field may become further dominant.

Also, the MNG resonator 1100 may include a matcher 1130 for impedance matching. The matcher 1130 may be configured to appropriately adjust the strength of magnetic field of the MNG resonator 1100. The impedance of the MNG resonator 1100 may be determined by the matcher 1130. In one or more embodiments, current may flow in the MNG resonator 1100 via a connector 1140, or may flow out from the MNG resonator 1100 via the connector 1140. And the connector 1140 may be connected to the ground conducting portion 1113 or the matcher 1130.

As shown in FIG. 11, the matcher 1130 may be positioned within the loop formed by the loop structure of the resonator 1100. The matcher 1130 may be configured to adjust the impedance of the resonator 1100 by changing the physical shape of the matcher 1130. For example, the matcher 1130 may include a conductor 1131 for the impedance matching in a location separate from the ground conducting portion 1113 by a distance h. The impedance of the resonator 1100 may be changed by adjusting the distance h.

In some implementations, a controller may be provided to control the matcher 1130. In this case, the matcher 1130 may change the physical shape of the matcher 1130 based on a control signal generated by the controller. For example, the distance h between the conductor 1131 of the matcher 1130 and the ground conducting portion 1113 may be increased or decreased based on the control signal. Accordingly, the physical shape of the matcher 1130 may be changed such that the impedance of the resonator 1100 may be adjusted. The distance h between the conductor 1131 of the matcher 1130 and the ground conducting portion 1113 may be adjusted using a variety of schemes. For example, a plurality of conductors may be included in the matcher 1130 and the distance h may be adjusted by adaptively activating one of the conductors. Alternatively or additionally, the distance h may be adjusted by adjusting the physical location of the conductor 1131 up and down. For instances, the distance h may be controlled based on the control signal of the controller. The controller may generate the control signal using various factors. As shown in FIG. 11, the matcher 1130 may be configured as a passive element such as the conductor 1131, for instance. Of course in other embodiments, the matcher 1130 may be configured as an active element such as a diode, a transistor, and the like. When the active element is included in the matcher 1130, the active element may be driven based on the control signal generated by the controller, and the impedance of the resonator 1100 may be adjusted based on the control signal. For example, if the active element is a diode included in the matcher 1130 the impedance of the resonator 1100 may be adjusted depending on whether the diode is in an on state or in an off state.

In some implementations, a magnetic core may be further provided to pass through the resonator 1100 configured as the MNG resonator. The magnetic core may perform a function of increasing a power transmission distance.

Figure 12:
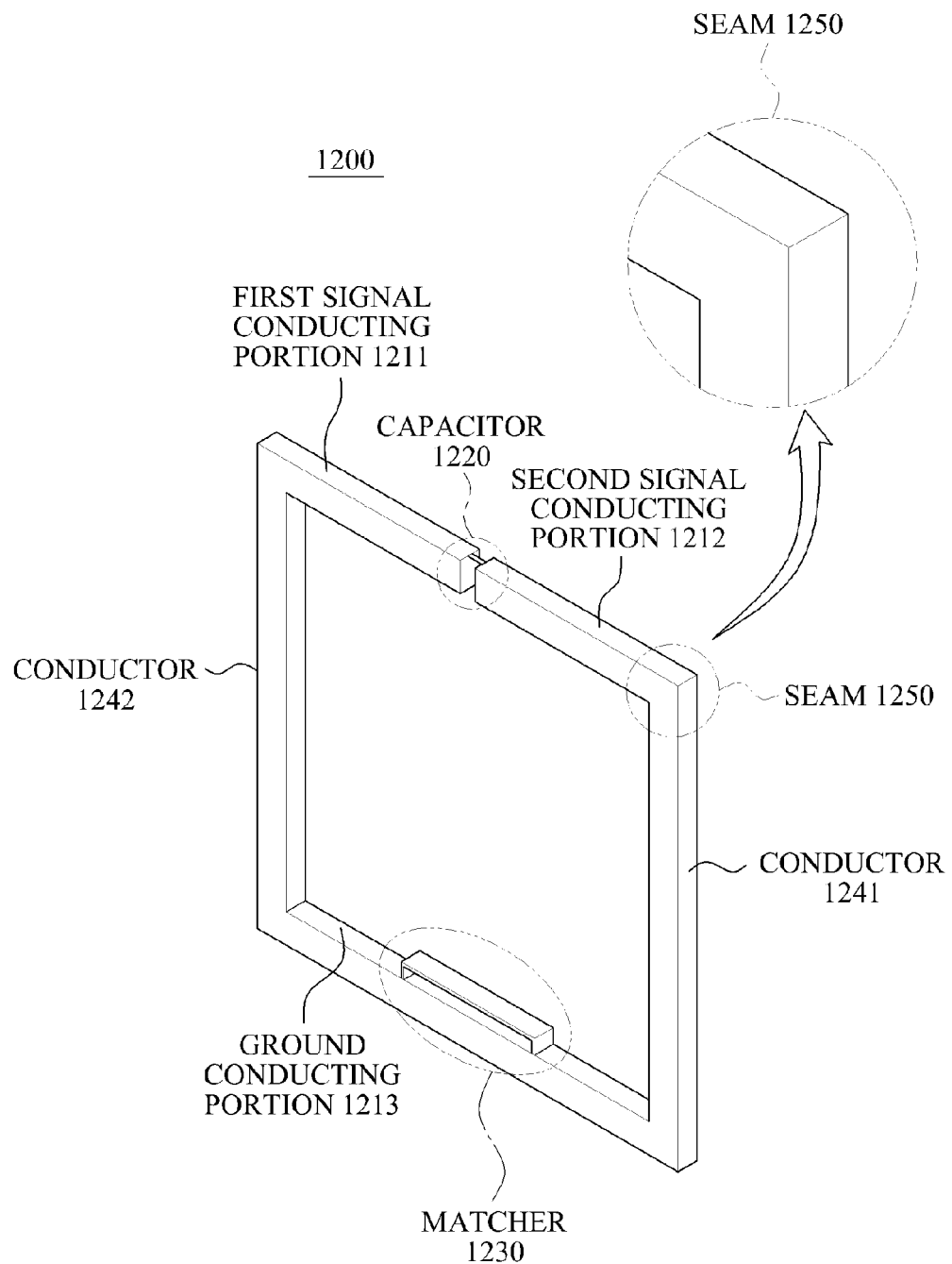
FIG. 12 is a diagram illustrating a resonator for wireless power transmission configured as a bulky type.

FIG. 12 illustrates a resonator 1200 for a wireless power transmission configured as a bulky type.

As used herein, the term "bulky type" may refer to a seamless connection connecting at least two parts in an integrated form.

Referring to FIG. 12, a first signal conducting portion 1211 and a second signal conducting portion 1212 may be integrally formed instead of being separately manufactured and thereby be connected to each other. Similarly, the second signal conducting portion 1212 and a conductor 1241 may also be integrally manufactured.

When the second signal conducting portion 1212 and the conductor 1241 are separately manufactured and then are connected to each other, a loss of conduction may occur due to a seam 1250. Thus, in some implementations, the second signal conducting portion 1212 and the conductor 1241 may be connected to each other without using a separate seam (i.e., seamlessly connected to each other). Accordingly, it is possible to decrease a conductor loss caused by the seam 1250. For instance, the second signal conducting portion 1212 and a ground conducting portion 1213 may be seamlessly and integrally manufactured. Similarly, the first signal conducting portion 1211, the conductor 1242 and the ground conducting portion 1213 may be seamlessly and integrally manufactured.

A matcher 1230 may be provided that is similarly constructed as described herein in one or more embodiments.

Figure 13:
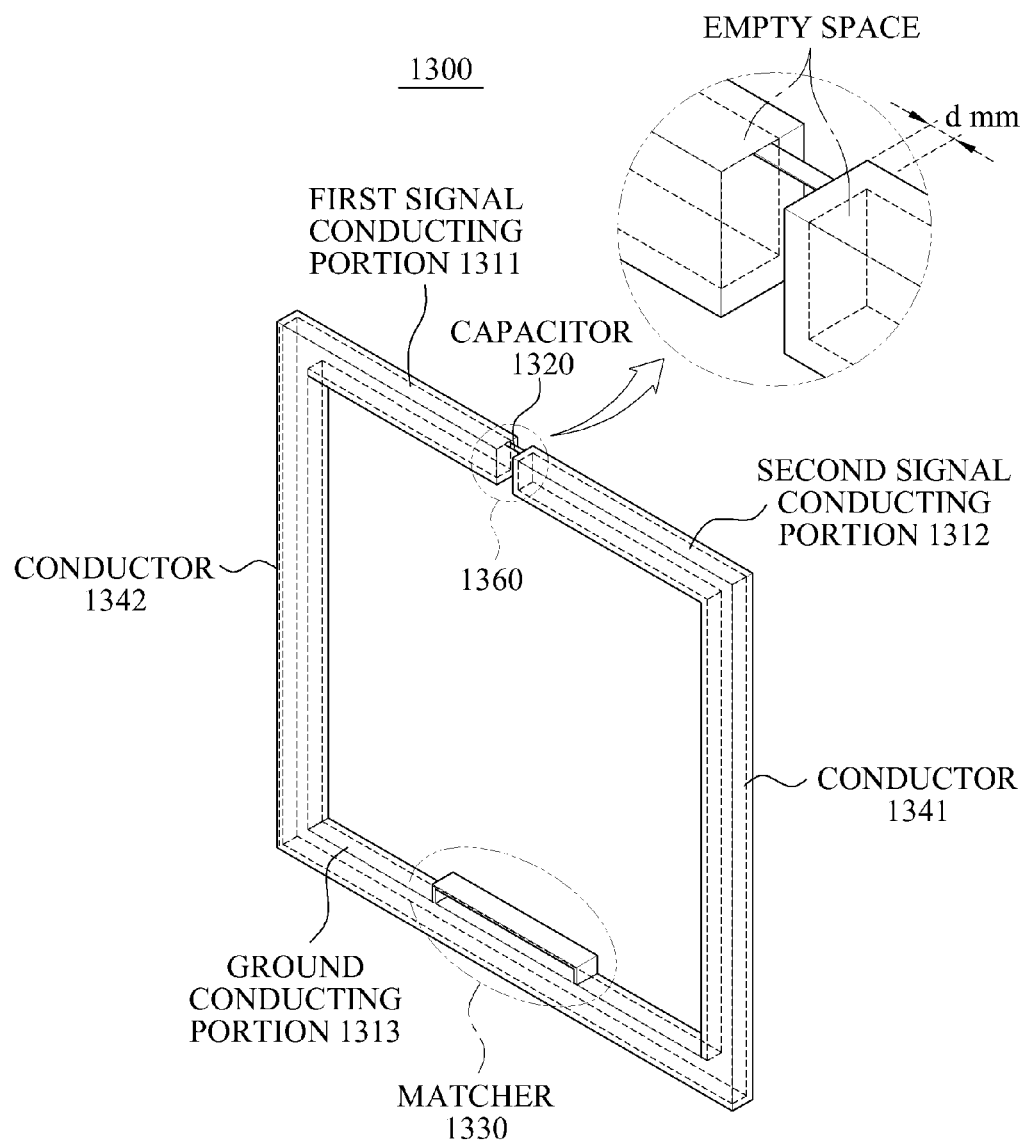
FIG. 13 is a diagram illustrating a resonator for wireless power transmission configured as a hollow type

FIG. 13 illustrates a resonator 1300 for a wireless power transmission, configured as a hollow type.

Referring to FIG. 13, each of a first signal conducting portion 1311, a second signal conducting portion 1312, a ground conducting portion 1313, and conductors 1341 and 1342 of the resonator 1300 configured as the hollow type structure. As used herein the term "hollow type" refers to a configuration that may include an empty space inside.

For a given resonance frequency, an active current may be modeled to flow in only a portion of the first signal conducting portion 1311 instead of all of the first signal conducting portion 1311, the second signal conducting portion 1312 instead of all of the second signal conducting portion 1312, the ground conducting portion 1313 instead of all of the ground conducting portion 1313, and the conductors 1341 and 1342 instead of all of the conductors 1341 and 1342. When a depth of each of the first signal conducting portion 1311, the second signal conducting portion 1312, the ground conducting portion 1313, and the conductors 1341 and 1342 is significantly deeper than a corresponding skin depth in the given resonance frequency, it may be ineffective. The significantly deeper depth may, however, increase a weight or manufacturing costs of the resonator 1300 in some instances.

Accordingly, for the given resonance frequency, the depth of each of the first signal conducting portion 1311, the second signal conducting portion 1312, the ground conducting portion 1313, and the conductors 1341 and 1342 may be appropriately determined based on the corresponding skin depth of each of the first signal conducting portion 1311, the second signal conducting portion 1312, the ground conducting portion 1313, and the conductors 1341 and 1342. When each of the first signal conducting portion 1311, the second signal conducting portion 1312, the ground conducting portion 1313, and the conductors 1341 and 1342 has an appropriate depth deeper than a corresponding skin depth, the resonator 1300 may become light, and manufacturing costs of the resonator 1300 may also decrease.

For example, as shown in FIG. 13, the depth of the second signal conducting portion 1312 (as further illustrated in the enlarged view region 1360 indicated by a circle) may be determined as "d" mm and d may be determined according to $$d = \frac{1}{\sqrt{\pi f \mu \sigma}}.$$

Here, f denotes a frequency, µ denotes a magnetic permeability, and σ denotes a conductor constant. In one implementation, when the first signal conducting portion 1311, the second signal conducting portion 1312, the ground conducting portion 1313, and the conductors 1341 and 1342 are made of a copper and they may have a conductivity of $5.8 \times 10^7$ siemens per meter ($S \cdot m^{-1}$), the skin depth may be about 0.6 mm with respect to 10 kHz of the resonance frequency and the skin depth may be about 0.006 mm with respect to 100 MHz of the resonance frequency.

A capacitor 1320 and a matcher 1330 may be provided that are similarly constructed as described herein in one or more embodiments.

Figure 14:
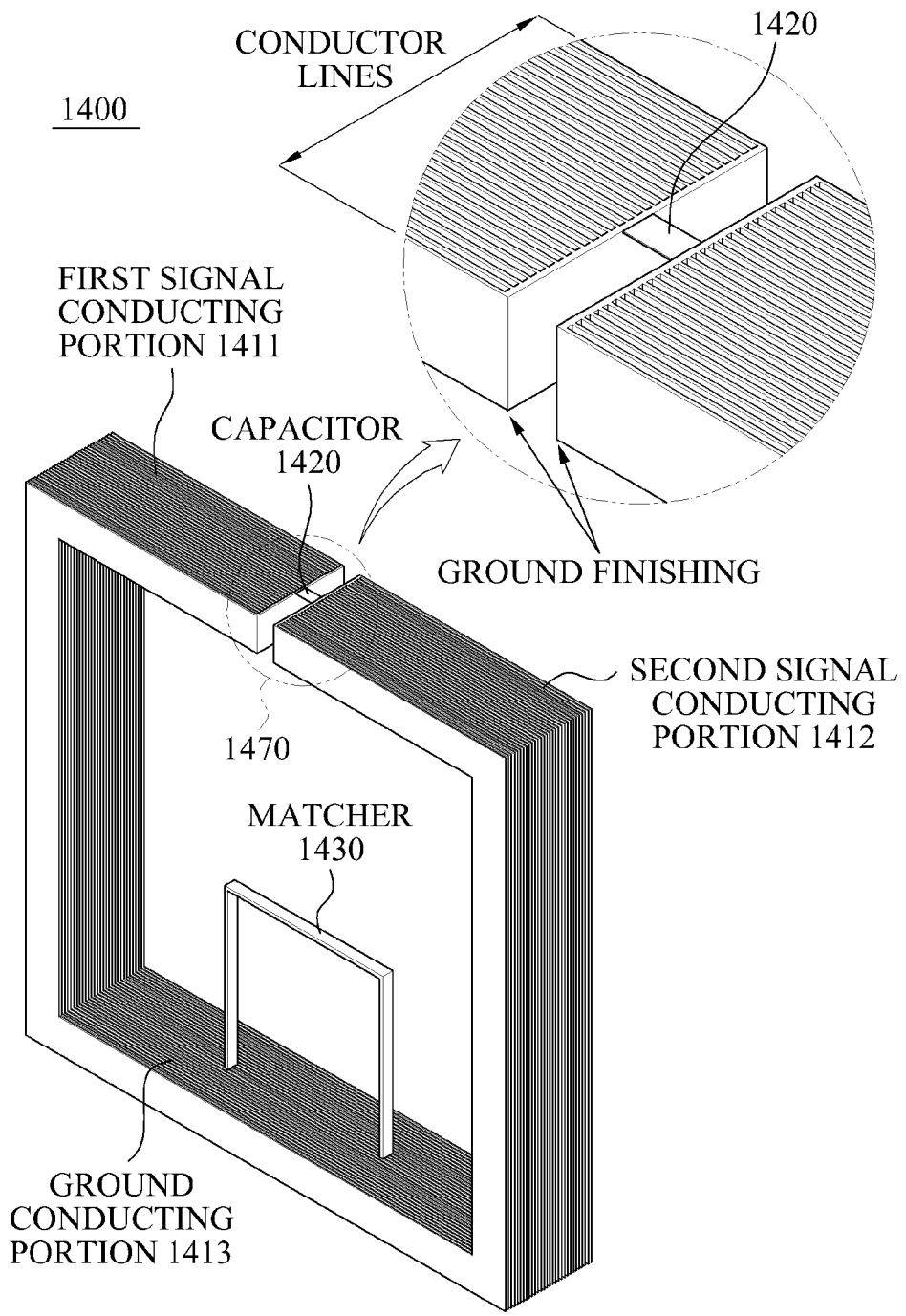
FIG. 14 is a diagram illustrating a resonator for wireless power transmission using a parallel-sheet.

FIG. 14 illustrates a resonator 1400 for a wireless power transmission using a parallel-sheet.

Referring to FIG. 14, the parallel-sheet may be applicable to each of a first signal conducting portion 1411 and a second signal conducting portion 1412 included in the resonator 1400.

Each of the first signal conducting portion 1411 and the second signal conducting portion 1412 may not be a perfect conductor and thus, may have an inherent resistance. Due to this resistance, an ohmic loss may occur. The ohmic loss may decrease a Q-factor and also decrease a coupling effect.

By applying the parallel-sheet to each of the first signal conducting portion 1411 and the second signal conducting portion 1412, it may be possible to decrease the ohmic loss, and to increase the Q-factor and the coupling effect. Referring to the enlarged view portion 1470 indicated by a circle, when the parallel-sheet is applied, each of the first signal conducting portion 1411 and the second signal conducting portion 1412 may include a plurality of conductor lines. The plurality of conductor lines may be disposed in parallel, and may be electrically connected (i.e., shorted) at an end portion of each of the first signal conducting portion 1411 and the second signal conducting portion 1412.

When the parallel-sheet is applied to each of the first signal conducting portion 1411 and the second signal conducting portion 1412, the plurality of conductor lines may be disposed in parallel. Accordingly, a sum of resistances having the conductor lines may decrease. Consequently, the resistance loss may decrease, and the Q-factor and the coupling effect may increase.

A capacitor 1420 and a matcher 1430 positioned on the ground conducting portion 1413 may be provided that are similarly constructed as described herein in one or more embodiments.

Figure 15:
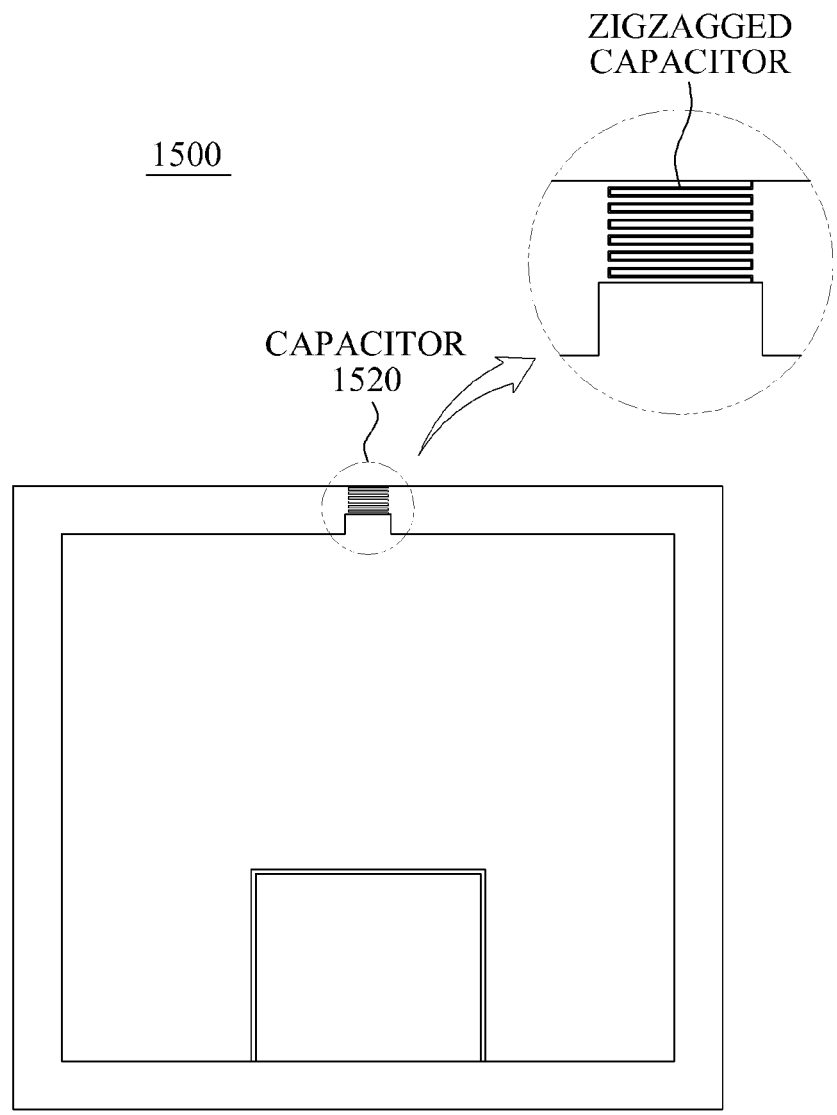
FIG. 15 is a diagram illustrating a resonator for wireless power transmission, the resonator including a distributed capacitor.

FIG. 15 illustrates a resonator 1500 for a wireless power transmission, including a distributed capacitor.

Referring to FIG. 15, a capacitor 1520 included in the resonator 1500 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 1520 as a distributed element, it may be possible to decrease the ESR. As will be appreciated, a loss caused by the ESR may decrease a Q-factor and a coupling effect.

As shown in FIG. 15, the capacitor 1520 may be configured as a conductive line having the zigzagged structure.

By employing the capacitor 1520 as the distributed element, it is possible to decrease the loss occurring due to the ESR in some instances. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 16A:
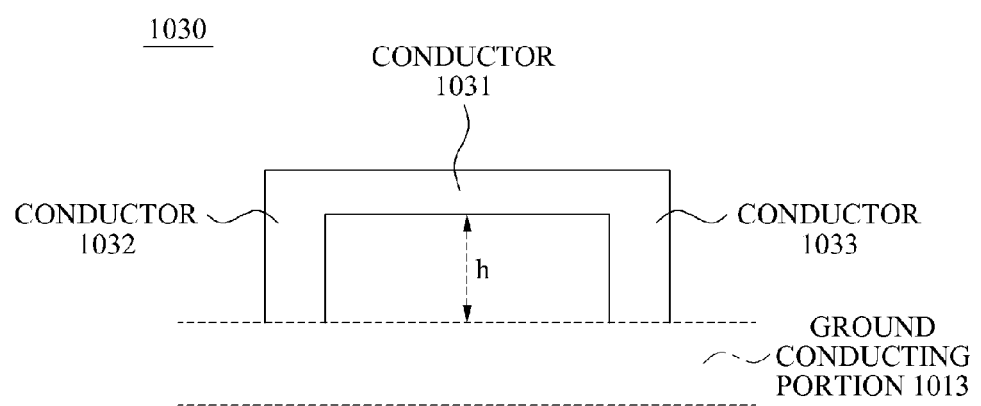
FIG. 16A is a diagram illustrating a matcher used by a 2D resonator.
Figure 16B:
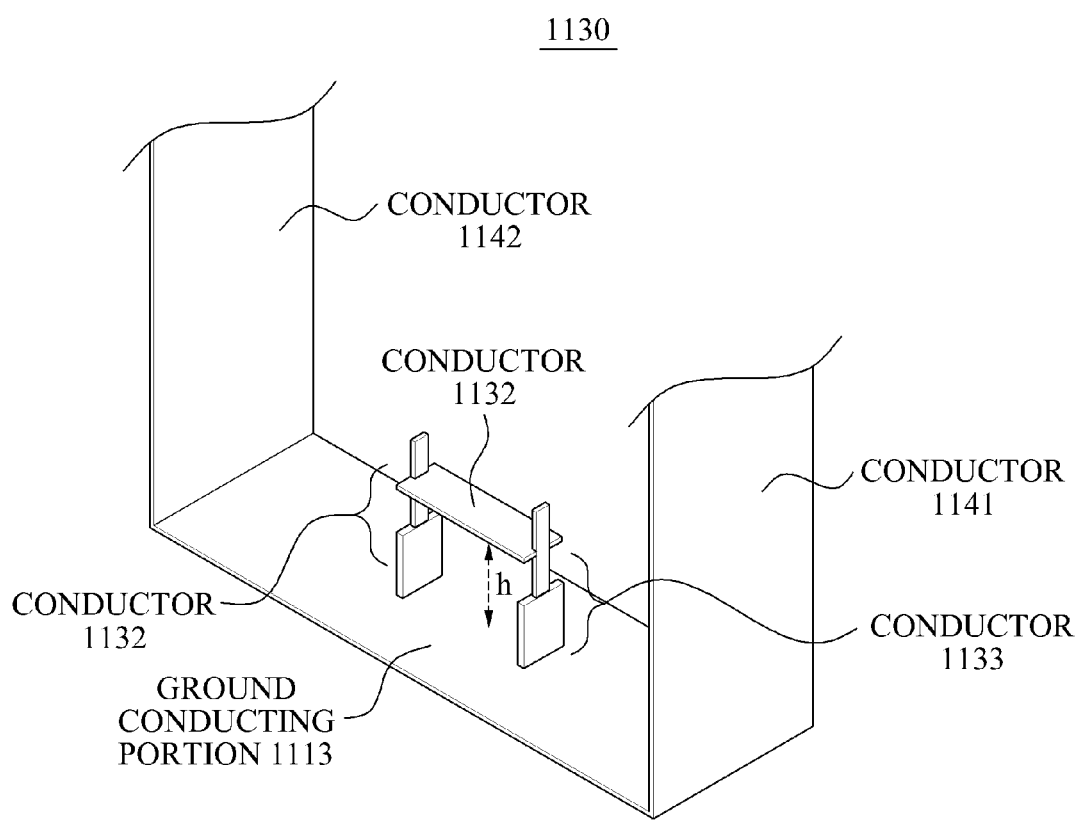
FIG. 16B is a diagram illustrating a matcher used by a 3D resonator.

FIG. 16A illustrates one embodiment of the matcher 1030 used in the resonator 1000 provided in the 2D structure of FIG. 10, and FIG. 16B illustrates an example of the matcher 1130 used in the resonator 1100 provided in the 3D structure of FIG. 11.

FIG. 16A illustrates a portion of the 2D resonator including the matcher 1030, and FIG. 16B illustrates a portion of the 3D resonator of FIG. 11 including the matcher 1130.

Referring to FIG. 16A, the matcher 1030 may include the conductor 1031, a conductor 1032, and a conductor 1033. The conductors 1032 and 1033 may be connected to the ground conducting portion 1013 and the conductor 1031. The impedance of the 2D resonator may be determined based on a distance h between the conductor 1031 and the ground conducting portion 1013. The distance h between the conductor 1031 and the ground conducting portion 1013 may be controlled by the controller. The distance h between the conductor 1031 and the ground conducting portion 1013 may be adjusted using a variety of schemes. For example, the variety of schemes may include, for instance, one or more of the following: a scheme of adjusting the distance h by adaptively activating one of the conductors 1031, 1032, and 1033, a scheme of adjusting the physical location of the conductor 1031 up and down, and/or the like.

Referring to FIG. 16B, the matcher 1130 may include the conductor 1131, a conductor 1032, a conductor 1033 and conductors 1141 and 1142. The conductors 1032 and 1033 may be connected to the ground conducting portion 1113 and the conductor 1131. Also, the conductors 1041 and 1042 may be connected to the ground conducting portion 1113. The impedance of the 3D resonator may be determined based on a distance h between the conductor 1131 and the ground conducting portion 1113. The distance h between the conductor 1131 and the ground conducting portion 1113 may be controlled by the controller, for example. Similar to the matcher 1030 included in the 2D structured resonator, in the matcher 1130 included in the 3D structured resonator, the distance h between the conductor 1131 and the ground conducting portion 1113 may be adjusted using a variety of schemes. For example, the variety of schemes may include, for instance, one or more of the following: a scheme of adjusting the distance h by adaptively activating one of the conductors 1031, 1032, and 1033, a scheme of adjusting the physical location of the conductor 1131 up and down, or the like.

Although not illustrated in FIGS. 16A and 16B, the matcher may include an active element. Thus, a scheme of adjusting an impedance of a resonator using the active element may be similar as described above. For example, the impedance of the resonator may be adjusted by changing a path of a current flowing through the matcher using the active element.

Figure 17:
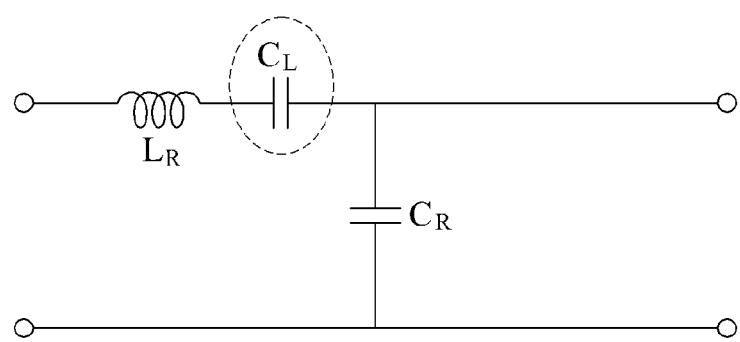
FIG. 17 is a diagram illustrating one equivalent circuit of the resonator for wireless power transmission of FIG. 10.

FIG. 17 illustrates one equivalent circuit of the resonator 1000 for the wireless power transmission of FIG. 10.

The resonator 1000 of FIG. 10 for the wireless power transmission may be modeled to the equivalent circuit of FIG. 17. In the equivalent circuit depicted in FIG. 17, $L_R$ denotes an inductance of the power transmission line, $C_L$ denotes a capacitor that is inserted in a form of a lumped element in the middle of the power transmission line, and $C_R$ denotes a capacitance between the power transmissions and/or ground of FIG. 10.

In some instances, the resonator 1000 may have a zeroth resonance characteristic. For example, when a propagation constant is "0", the resonator 1000 may be assumed to have $\omega_{MZR}$ as a resonance frequency. The resonance frequency $\omega_{MZR}$ may be expressed by Equation 1.

$$\omega_{MZR} = \frac{1}{\sqrt{L_R C_L}} \quad [\text{Equation 1}]$$

In Equation 1, MZR denotes a Mu zero resonator.

Referring to Equation 1, the resonance frequency $\omega_{MZR}$ of the resonator 1000 may be determined by $L_R/C_L$. A physical size of the resonator 1000 and the resonance frequency $\omega_{MZR}$ may be independent with respect to each other. Since the physical sizes are independent with respect to each other, the physical size of the resonator 1000 may be sufficiently reduced.

The units described herein may be implemented using hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter using an in-band communication, the wireless power transmitter comprising:
   a source resonance unit including a source resonator that is configured to transmit wireless power to one or more in-band resonators;
   a source controller configured to control a resonance frequency and an impedance of the source resonator, to detect an in-band resonator located in a location corresponding to a wireless power receiver among the in-band resonators, and to generate a control signal of the detected in-band resonator; and
   an in-band resonance unit configured to receive and demodulate identification information associated with the wireless power receiver via the one or more in-band resonators, and to transmit the wireless power and transmission data via the in-band resonator corresponding to the wireless power receiver, wherein the transmission data is modulated according to switching of the in-band resonators.

2. The wireless power transmitter of claim 1, further comprising:

a power converting unit configured to convert a DC voltage of a predetermined level into an AC power based on a predetermined switching pulse signal;

a power amplifier configured to amplify the AC power to an AC power of at least a predetermined value; and a matching controller configured to set, based on the demodulated identification information, an impedance matching frequency and a resonance bandwidth of the source resonator that is to transmit the amplified AC power.

3. The wireless power transmitter of claim 1, wherein the in-band resonance unit comprises:

an array resonator including an array of in-band resonators, one or more of the in-band resonators configured to transmit wireless power and transmission data to a corresponding predetermined area;

a modulator configured to modulate the transmission data by controlling the switching of the in-band resonators;

a demodulator configured to demodulate reception data received from the wireless power receiver; and an in-band resonator controller configured to control modulation of the transmission data and demodulation of the reception data.

4. The wireless power transmitter of claim 3, wherein the in-band resonators are positioned between the source resonator and a target resonator so as to increase a wireless power transmission distance between the source resonator and the target resonator.

5. The wireless power transmitter of claim 3, wherein the array resonance unit is configured to receive the reception data from the wireless power receiver via one or more of the in-band resonators.

6. The wireless power transmitter of claim 3, wherein the array resonance unit is configured to switch on a switch of an in-band resonator that transmits the wireless power among the in-band resonators, and to switch remaining in-band resonators off.

7. The wireless power transmitter of claim 3, wherein the modulator is configured to switch a predetermined number of in-band resonators among the in-band resonators on and off.

8. The wireless power transmitter of claim 3, wherein the modulator is configured to perform analog modulation or digital modulation of the transmission data by switching the in-band resonators on and off.

9. The wireless power transmitter of claim 3, wherein the source controller is configured to receive the demodulated reception data to determine whether to charge the wireless power receiver, and to generate the control signal of the in-band resonator corresponding to the wireless power receiver to enable the wireless power to be transmitted via the in-band resonator.

10. A wireless power receiver using an in-band communication, the wireless power receiver comprising:

a target resonance unit configured to receive, from an in-band resonator, a wireless power and reception data including a wake-up signal;

a demodulator configured to demodulate the reception data including the wake-up signal;

a modulator configured to modulate transmission data including a response signal with respect to the wake-up signal, a charging request signal, and an identification (ID) of a target resonator that is awoken; and a target controller configured to control an impedance to perform impedance matching between a source resonator, the in-band resonator, and the awoken target resonator.

11. The wireless power receiver of claim 10, further comprising:

a power determining unit configured to determine, based on the reception data, whether the target resonator is awoken and whether to charge a load.

12. The wireless power receiver of claim 10, wherein the target resonance unit is configured to transmit the modulated transmission data to the in-band resonator.

13. A method of transmitting wireless power using an in-band communication, the method comprising:

receiving identification information associated with a wireless power receiver, via in-band resonators;

demodulating the received identification information;

controlling, based on the demodulated identification information, an impedance and a resonance frequency of a source resonator;

transmitting the wireless power from the source resonator to the in-band resonators via a magnetic coupling; and transmitting the wireless power and transmission data, via an in-band resonator corresponding to the wireless power receiver from among the in-band resonators, wherein the transmission data is modulated according to switching of the in-band resonators.

14. The method of claim 13, further comprising:

detecting, from among the in-band resonators, the in-band resonator corresponding to the wireless power receiver; and generating a control signal of the detected in-band resonator.

15. The method of claim 13, wherein transmitting the wireless power and the transmission data comprises:

modulating the transmission data by switching switches of the in-band resonators on and off;

demodulating reception data received from the wireless power receiver; and transmitting the wireless power and the transmission data to a predetermined area via an array in-band resonators configured by forming the array of the in-band resonators.

16. A method of receiving wireless power using an in-band communication, the method comprising:

receiving wireless power and reception data including a wake-up signal, from an in-band resonator;

demodulating the reception data including the wake-up signal;

modulating transmission data including a response signal with respect to the wake-up signal, a charging request signal, and an identification (ID) of a target resonator that is awoken; and controlling an impedance used to perform impedance matching between a source resonator, the in-band resonator, and the awoken target resonator.

17. The method of claim 16, further comprising:

determining, based on the reception data, whether the target resonator is awoken and whether to charge a load.

18. The method of claim 16, wherein the wireless power and the reception data are received via a magnetic coupling.

19. The method of claim 13, wherein the wireless power and the transmission data are simultaneously transmitted.

20. The wireless power transmitter of claim 1, wherein the wireless power and the transmission data are simultaneously transmitted.

* * * * *